United States Patent
Shimono et al.

(10) Patent No.: US 8,747,973 B2
(45) Date of Patent: Jun. 10, 2014

(54) FLUID TRANSFER MEMBER

(75) Inventors: Takeshi Shimono, Settsu (JP); Takahisa Aoyama, Settsu (JP); Hiroshi Torimae, Settsu (JP); Takahiro Kitahara, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 11/578,410

(22) PCT Filed: Apr. 13, 2005

(86) PCT No.: PCT/JP2005/007132
§ 371 (c)(1),
(2), (4) Date: Oct. 13, 2006

(87) PCT Pub. No.: WO2005/108051
PCT Pub. Date: Nov. 17, 2005

(65) Prior Publication Data
US 2007/0166497 A1  Jul. 19, 2007

(30) Foreign Application Priority Data
Apr. 13, 2004  (JP) ................................. 2004-118366

(51) Int. Cl.
*B32B 27/30* (2006.01)
(52) U.S. Cl.
USPC ........... 428/35.7; 428/420; 428/421; 428/422
(58) Field of Classification Search
USPC .............. 428/421, 411.1, 500, 515, 422, 394, 428/364, 35.7; 521/121, 27, 28; 522/117; 525/200
See application file for complete search history.

(56) References Cited

U.S. PATENT DOCUMENTS

| | | | |
|---|---|---|---|
| 3,053,818 A | 9/1962 | Honn et al. | |
| 3,331,811 A | 7/1967 | Schafer | |
| 3,355,347 A | 11/1967 | Habermann | |
| 4,743,658 A * | 5/1988 | Imbalzano et al. | 525/326.4 |
| 6,089,278 A | 7/2000 | Nishino et al. | |
| 6,177,196 B1 | 1/2001 | Brothers et al. | |
| 6,355,321 B1 | 3/2002 | Nishino et al. | |
| 6,655,414 B2 | 12/2003 | Nishi et al. | |
| 6,656,553 B2 | 12/2003 | Nishi et al. | |
| 6,679,297 B1 | 1/2004 | Nishi et al. | |
| 6,680,124 B1 | 1/2004 | Araki et al. | |

(Continued)

FOREIGN PATENT DOCUMENTS

| | | |
|---|---|---|
| CN | 1477133 A | 2/2004 |
| DE | 19805832 A1 | 8/1999 |

(Continued)

OTHER PUBLICATIONS

Office Action for U.S. Appl. No. 10/556,456; mail date Jul. 21, 2009.

(Continued)

*Primary Examiner* — Ellen S Raudenbush
(74) *Attorney, Agent, or Firm* — Sughrue Mion, PLLC (57) ABSTRACT

The present invention provides a fluid transfer member having thermal stability on the occasion of molding, stress cracking resistance and low liquid chemical permeability at the same time. The present invention is a fluid transfer member which is composed by a laminate containing a layer [P] comprising a fluoropolymer and/or a fluorine-free organic material and a layer [Q] comprising a chlorotrifluoroethylene copolymer.

9 Claims, 1 Drawing Sheet

(56) References Cited

U.S. PATENT DOCUMENTS

| | | |
|---|---|---|
| 6,696,526 B1 | 2/2004 | Kaulbach et al. |
| 6,706,351 B2 | 3/2004 | Abusleme et al. |
| 6,706,794 B1 | 3/2004 | Tsuda et al. |
| 6,740,375 B1 * | 5/2004 | Sagisaka et al. ............ 428/35.7 |
| 6,881,460 B2 | 4/2005 | Inaba et al. |
| 6,893,729 B2 | 5/2005 | Inaba et al. |
| 7,078,470 B2 | 7/2006 | Funaki et al. |
| 2002/0010277 A1 | 1/2002 | Kaulbach et al. |
| 2002/0119319 A1 | 8/2002 | Funaki et al. |
| 2003/0068499 A1 | 4/2003 | Abusleme et al. |
| 2003/0121560 A1 | 7/2003 | Morohoshi et al. |
| 2003/0198770 A1 | 10/2003 | Fukushi et al. |
| 2004/0001956 A1 * | 1/2004 | Funaki et al. ................ 428/422 |
| 2005/0020792 A1 | 1/2005 | Aoyama et al. |
| 2007/0026177 A1 | 2/2007 | Kitahara et al. |
| 2007/0219333 A1 | 9/2007 | Shimono et al. |

FOREIGN PATENT DOCUMENTS

| | | | |
|---|---|---|---|
| EP | 1223030 A2 | | 7/2002 |
| EP | 1531164 | * | 6/2003 |
| EP | 1053284 B1 | | 7/2003 |
| EP | 1 375 539 A1 | | 1/2004 |
| EP | 1531164 A1 | | 5/2005 |
| EP | 1 627 731 A1 | | 2/2006 |
| JP | 48-25415 | | 7/1973 |
| JP | 54-132691 A | | 10/1979 |
| JP | 60-88078 A | | 5/1985 |
| JP | 63-307069 A | | 12/1988 |
| JP | 63-307609 A | | 12/1988 |
| JP | 3-287614 A | | 12/1991 |
| JP | 4-83 | | 1/1992 |
| JP | 4-83 B | | 1/1992 |
| JP | 9-137900 | | 5/1997 |
| JP | 11-207840 A | | 8/1999 |
| JP | 2000-7732 A | | 1/2000 |
| JP | 2000-291849 A | | 10/2000 |
| JP | 2001-88816 | | 4/2001 |
| JP | 2001-88816 A | | 4/2001 |
| JP | 2001088816 | * | 4/2001 |
| JP | 2002-503744 A | | 2/2002 |
| JP | 2002-144499 | | 5/2002 |
| JP | 2002-144499 A | | 5/2002 |
| JP | 2002-210892 | | 7/2002 |
| JP | 2002-210892 A | | 7/2002 |
| JP | 2002-213655 A | | 7/2002 |
| JP | 2002-267054 A | | 9/2002 |
| JP | 2002-307624 A | | 10/2002 |
| JP | 2002-327018 | | 11/2002 |
| JP | 2002-327018 A | | 11/2002 |
| JP | 2002327018 | * | 11/2002 |
| JP | 2002-357285 A | | 12/2002 |
| JP | 2003-311764 A | | 11/2003 |
| JP | 2004-277689 A | | 10/2004 |
| JP | 2004-358959 | | 12/2004 |
| JP | 2004-358959 A | | 12/2004 |
| KR | 10-0303858 | | 11/2001 |
| WO | 9900249 A1 | | 1/1999 |
| WO | 99/45044 A1 | | 9/1999 |
| WO | 01/18142 A1 | | 3/2001 |
| WO | 01/23795 A1 | | 4/2001 |
| WO | 01/58686 A1 | | 8/2001 |
| WO | 01/60606 A1 | | 8/2001 |
| WO | WO 03/048214 A1 | | 6/2003 |
| WO | WO 2003/48214 A | | 6/2003 |
| WO | 2004/098880 A1 | | 11/2004 |

OTHER PUBLICATIONS

Office Action for U.S. Appl. No. 11/578,066; mail date Jan. 27, 2010.
Chemical Abstracts, vol. 66, May 12, 1984, Abstract No. 38567, Habermann Kenneth R., "Laminated Polymer Sheets" & BE 670586 (Allied Chemical Corp.).
Office Action for U.S. Appl. No. 10/594,065 ; mail date Jul. 21, 2009.
Office Action for U.S. Appl. No. 11/578,066 ; mail date Apr. 30, 2009.
Office Action dated Jul. 22, 2010 in co-pending U.S. Appl. No. 11/578,066.

* cited by examiner

FLUID TRANSFER MEMBER

TECHNICAL FIELD

The present invention relates to a fluid transfer member.

BACKGROUND ART

Tubes and like moldings made of a tetrafluoroethylene/perfluoro(alkyl vinyl ether) copolymer [PFA] are resistant to liquid chemicals and hardly contaminate liquids and the like flowing therethrough and, therefore, have so far been used as materials for the piping/tubing system for transferring high-purity liquids, in particular as materials for the piping/tubing system in semiconductor manufacturing equipment, among others. However, PFA tubes have a problem, namely they are fairly high in liquid chemical permeability.

As an outer tube material to be molded in close contact with existing PFA tubes for attaining reductions in liquid chemical permeability, there is described, for example, a polychlorotrifluoroethylene [PCTFE] (cf. e.g. Patent Document 1: Japanese Kokai (Laid-open) Publication H09-137900). However, these tubes still have a problem; namely, when PFA and PCTFE are actually subjected to multilayer extrusion molding, the PCTFE is inferior in thermal stability on the occasion of molding and in stress cracking resistance.

As a CTFE copolymer, there has also been proposed a fluoropolymer having a copolymerization composition comprising 50 to 99.8 mole percent of TFE and/or CTFE, 0.1 to 49.99 mole percent of a fluoromonomer other than TFE and CTFE and 0.01 to 5 mole percent of at least one compound selected from among itaconic acid, citraconic acid and acid anhydrides thereof (cf. e.g. Patent Document 2: Laid-open European Patent Application No. 1375539). This fluoropolymer comprises such a compound as itaconic acid as an essential copolymerization component for attaining improvements in bond strength. However, there is no concrete disclosure at all about a fluoropolymer comprising both TFE and CTFE as copolymerization components.

DISCLOSURE OF INVENTION

Problems Which the Invention is to Solve

In view of the above-discussed state of the art, it is an object of the present invention to provide a fluid transfer member having thermal stability on the occasion of molding, stress cracking resistance and low liquid chemical permeability at the same time.

Means for Solving the Problems

The present invention is a fluid transfer member which is composed by a laminate containing a layer [P] comprising a fluoropolymer and/or a fluorine-free organic material and a layer [Q] comprising a chlorotrifluoroethylene copolymer.

In the following, the invention is described in detail.

The fluid transfer member of the invention is composed by a laminate containing a layer [P] and a layer [Q].

The layer [P] comprises a fluoropolymer and/or a fluorine-free organic material.

The fluoropolymer is a polymer containing at least one fluorine atom.

The fluoropolymer preferably is at least one species selected from the group consisting of a tetrafluoroethylene [TFE]/perfluoro(alkyl vinyl ether) [PAVE] copolymer, a TFE/hexafluoropropylene [HFP] copolymer, an ethylene [Et]/TFE copolymer, a polychlorotrifluoroethylene [PCTFE], an Et/chlorotrifluoroethylene [CTFE] copolymer [ECTFE] and an polyvinylidene fluoride [PVdF].

The "PCTFE" so referred to herein is a CTFE homopolymer obtained by polymerizing substantially CTFE alone.

The fluoropolymer constituting the layer [P] may be a CTFE copolymer. The CTFE copolymer which can constitute the layer [P] may be one derived from the same monomer species as the monomers constituting the CTFE copolymer used to constitute the layer [Q] to be described layer herein. When both the CTFE copolymers are common in monomers, the layer [P] and layer [Q] are distinguished by the difference in monomer ratio and/or by such a difference in drawn state as mentioned below. When the CTFE copolymer constituting the layer [P] and the CTFE copolymer constituting the layer [Q] each is an Et/CTFE copolymer, for instance, the CTFE copolymers in both layers are distinguished by the difference in copolymerization composition ratio between Et and CTFE.

When the fluoropolymer constituting the layer [P] is a CTFE copolymer, one of the layer [P] and layer [Q] may be a drawn or stretched one and the other may be an undrawn one, or the resulting laminate may comprise a drawn layer constituting the layer [P] and a drawn layer constituting the layer [Q] which have been drawn under different drawing conditions.

The above-mentioned fluoropolymer is preferably one comprising a TFE/PAVE copolymer because of its being excellent in chemical resistance.

The PAVE in the above-mentioned TFE/PAVE copolymer is preferably a perfluoro(alkyl vinyl ether) represented by the general formula (II):

$$CF_2=CF-ORf^1 \qquad (II)$$

(wherein $Rf^1$ represents a perfluoroalkyl group containing 1 to 8 carbon atoms). As the perfluoro(alkyl vinyl ether) represented by the general formula (II), there may be mentioned perfluoro(methyl vinyl ether) [PMVE], perfluoro(ethyl vinyl ether) [PEVE], perfluoro(propyl vinyl ether) [PPVE] and perfluoro(butyl vinyl ether), among others, and PMVE, PEVE or PPVE is preferred.

Thus, the TFE/PAVE copolymer is preferably a TFE/PMVE copolymer or a TFE/PPVE copolymer and is more preferably a TFE/PPVE copolymer.

The TFE/PAVE copolymer may be the product of copolymerization of TFE and a PAVE and, further, another monomer copolymerizable therewith.

The other copolymerizable monomer is not particularly restricted but includes, among others, those mentioned later herein as the monomer [A].

When it is to be melt-molded at a molding temperature of 300° C. or above, the fluoropolymer preferably contains not more than 80 unstable terminal groups per $10^6$ carbon atoms. When the number of such groups exceeds 80 per $10^6$ carbon atoms, blowing tends to occur in the step of melt molding at a molding temperature of 300° C. or above. A more preferred upper limit is 40, a still more preferred upper limit is 20, and a particularly preferred upper limit is 6. The number of unstable terminal groups may be reduced, within the above range, to 1, for instance, from the detection limit viewpoint.

In the case of melt molding at a molding temperature lower than 300° C., the number of unstable terminal groups preferably exceeds 80 per $10^6$ carbon atoms. When that number is not larger than 80 per $10^6$ carbon atoms in the case of melt molding at a molding temperature below 300° C., the adhesiveness may decrease in certain cases. A more preferred lower limit is 100, a still more preferred lower limit is 150, a particularly preferred lower limit is 180 and a most preferred lower limit is 220. When the number of unstable terminal groups is within the above range in the case of melt molding at a molding temperature lower than 300° C., an upper limit may be set, for example, at 500 from the productivity viewpoint.

The above-mentioned number of unstable terminal groups is the value obtained by carrying out measurements using an infrared spectrophotometer [IR].

The unstable terminal groups are generally formed by addition, to the main chain terminus or termini, of the chain transfer agent or the polymerization initiator used in the step of polymerization and thus are derived from the structure of the chain transfer agent and/or polymerization initiator.

The "unstable terminal groups" so referred to herein include —$CF_2CH_2OH$, —$CONH_2$, —COF, —COOH, —$COOCH_3$, —CF=$CF_2$ and —$CF_2H$. Among such unstable terminal groups, —$CF_2CH_2OH$, —$CONH_2$, —COF, —COOH and —$COOCH_3$ readily exert influences on the adhesiveness and the blowing in the step of melt molding.

The number of unstable terminal groups is the number obtained by compression molding the CTFE copolymer in a powder form at a molding temperature higher by 50° C. than the melting point thereof and at a molding pressure of 5 MPa, subjecting the thus-obtained film sheet with a thickness of 0.25 to 0.30 mm to infrared absorption spectrometry, determining the species by comparison with infrared absorption spectra for known films and making a calculation based on the differential spectrum thereof according to the following formula:

Number of terminal groups (per $10^6$ carbon atoms)= $(l \times K)/t$ where:
l: Absorbance
K: Correction factor
T: Film thickness (mm)

The correction factors for the terminal groups in question are shown in Table 1.

TABLE 1

| Terminal group | Absorption frequency ($cm^{-1}$) | Correction factor |
| --- | --- | --- |
| —COF | 1884 | 405 |
| —COOH | 1813, (1795–1792), 1775 | 455 |
| —$COOCH_3$ | 1795 | 355 |
| —$CONH_2$ | 3438 | 408 |
| —$CH_2OH$ | 3648 | 2325 |

The correction factors given in Table 1 are the values determined from infrared absorption spectra of model compounds for calculating the number of corresponding terminal groups per $10^6$ carbon atoms.

Such unstable terminal groups in the fluoropolymer can be stabilized, for example, by using the method comprising exposure to a fluorine-containing gas or the method comprising adding a metal or a metal salt, where desirable, and heating in the presence of water.

The layer [P] in the laminate of the invention may be made of a fluorine-free organic material. The fluorine-free organic material is an organic material containing no fluorine atoms.

The fluorine-free organic material is preferably a resin coextrudable with the fluororesin to constitute the layer [Q].

Since the laminate of the invention contains the above-mentioned layer [Q], the laminate as a whole can attain a high level of impermeability even when the layer [P] is not so excellent in liquid chemical impermeability, gas impermeability and fuel impermeability. Therefore, the layer [P] is not necessarily required to be excellent in chemical liquid impermeability, gas impermeability and fuel impermeability. However, the use of a resin having chemical liquid impermeability, gas impermeability and fuel impermeability as the fluorine-free organic material for constituting the layer [P] is not excluded. The use of a resin having liquid chemical impermeability, gas impermeability and fuel impermeability is rather preferred.

The resin having liquid chemical impermeability, gas impermeability and fuel impermeability, which is to be used as the fluorine-free organic material is preferably a resin comprising a polymer high in degree of crystallinity, more preferably a resin comprising a high crystallinity polymer containing a polar functional group species and showing a great intermolecular force.

The polar functional group is a functional group having polarity and capable of participating in the adhesion to the CTFE copolymer (which may be an adhesive fluororesin). The polar functional group may be the same as the unstable terminal group or may be a different functional group.

The polar functional group is not particularly restricted but includes those mentioned above as unstable functional groups and, further, cyano and sulfide groups and so forth and, among others, carbonyloxy, cyano, sulfide and hydroxyl groups are preferred. The hydroxyl group is more preferred.

The above-mentioned fluorine-free organic material preferably is a polyamide resin and/or a polyolefin resin.

The polyamide resin comprises a polymer having an amide bond [—NH—C(=O)—] as the repeating unit in the molecule.

The polyamide resin may be either the so-called nylon resin comprising a polymer in which each amide bond in the molecule binds aliphatic structures or alicyclic structures together, or the so-called aramid resin comprising a polymer in which each amide bond in the molecule binds aromatic structures together.

The above-mentioned nylon resin is not particularly restricted but includes, among others, those comprising such polymers as nylon 6, nylon 66, nylon 11, nylon 12, nylon 610, nylon 612, nylon 6/66, nylon 66/12, nylon 46 and metaxylylenediamine/adipic acid copolymers. Two or more of these may also be used in combination.

The aramid resin is not particularly restricted but includes, for example, polyparaphenyleneterephthalamide and polymetaphenyleneisophthalamide.

The above polyamide resin may also comprise a polymer whose molecule partly contains a structure having no amide bond as the repeating unit as introduced therein by block copolymerization or graft copolymerization. As such polyamide resin, there may be mentioned, for example, nylon 6/polyester copolymer, nylon 6/polyether copolymer, nylon 12/polyester copolymer, nylon 12/polyether copolymer and like polyamide elastomer. These polyamide elastomers are obtained by block copolymerization, via ester bonding, of a nylon oligomer and a polyester oligomer, or by block copolymerization, via ether bonding, of a nylon oligomer and a polyether oligomer. As the polyester oligomer, there may be mentioned, for example, polycaprolactone and polyethylene adipate and, as the polyether oligomer, there may be mentioned, for example, polyethylene glycol, polypropylene glycol and polytetramethylene glycol. Preferred as the polyamide elastomer are nylon 6/polytetramethylene glycol copolymer and nylon 12/polytetramethylene glycol copolymer.

As the polyamide resin, there may be mentioned, among others, nylon 6, nylon 66, nylon 11, nylon 12, nylon 610, nylon 612, nylon 6/66, nylon 66/12, nylon 6/polyester copolymer, nylon 6/polyether copolymer, nylon 12/polyester copolymer and nylon 12/polyether copolymer since even when the polyamide resin layer is thin, these can provide sufficient levels of mechanical strength. It is also possible to use two or more of these in combination.

The above-mentioned polyolefin resin is a resin having a monomer unit derived from a vinyl group-containing monomer containing no fluorine atoms. The vinyl group-containing monomer containing no fluorine atoms is not particularly restricted but may be, for example, such a fluorine-free ethylenic monomer as mentioned above referring to the fluororesin. In the field of application where interlaminar adhesiveness to the counterpart material such as the layer [Q] is required, such polar functional group-containing ones as mentioned above are preferred.

The polyolefin resin is not particularly restricted but includes, for example, polyethylene, polypropylene, high-density polyolefins and like polyolefins and, further, modified polyolefins, for example maleic anhydride modifications of the above-mentioned polyolefins.

As the fluorine-free organic material, there may be mentioned, in addition to the above-mentioned polyamide resins and polyolefin resins, ethylene/vinyl alcohol copolymer-based resin, polyurethane resin, polyester resin, polyaramid resin, polyimide resin, polyamideimide resin, polyphenylene oxide resin, polyacetal resin, polycarbonate resin, acrylic resin, styrenic resin, acrylonitrile/butadiene/styrene [ABS] resin, vinyl chloride resin, cellulosic resin, polyetheretherketone [PEEK] resin, polysulfone resin, polyethersulfone [PES] resin, polyetherimide resin and polyphenylene sulfide resin, among others.

The layer [P] in the laminate of the invention can be rendered electrically conductive by further incorporating a conductive material in the above-mentioned fluororesin and/or fluorine-free organic material. The conductive material is not particularly restricted but includes, for example, metals, carbon and like conductive simple substance powders or conductive simple substance fibers; powders of conductive materials such as zinc oxide; and surface-treated conductive powders.

The conductive simple substance powders or conductive simple substance fibers are not particularly restricted but include, among others, powders of metals such as copper and nickel; metal fibers such as iron or stainless steel fibers; carbon black and carbon fibers.

The surface-treated conductive powders are powders obtained by subjecting glass beads, titanium oxide and like nonconductive powders to surface treatment for rendering the surface thereof electrically conductive. The method of rendering the surface conductive is not particularly restricted but includes, among others, metal sputtering and nonelectrolytic plating.

Among the conductive materials mentioned above, carbon black is suitably used since it is advantageous from the economy and electrostatic charge accumulation prevention viewpoint.

In incorporating the above conductive material in the fluororesin and/or fluorine-free organic material, the resulting mixture is preferably made into pellets in advance by melt kneading.

As for the pellet heating conditions for pelletization after melt kneading, when the polymer material constituting the layer [P] is a fluororesin, the pelletization is generally carried out at a temperature not lower than the glass transition temperature of the fluororesin but lower than the melting point of the fluororesin, usually at 130 to 200° C., for 1 to 48 hours. By preparing pellets in advance, it becomes possible to uniformly disperse the conductive material in the fluororesin and provide the layer [P] with uniform conductivity. When the polymer material constituting the layer [P] is a fluorine-free organic material, the pelletization is generally carried out after melt kneading at a temperature not lower than the melting point of the fluorine-free organic material but lower than the thermal decomposition temperature thereof.

The level of addition of the conductive material is properly determined based on the fluororesin and/or fluorine-free organic material species, the conductivity performance characteristics required of the laminate, the molding conditions and other factors. Preferably, however, the addition level is 1 to 30 parts by mass per 100 parts by mass of the fluororesin or fluorine-containing organic material. A more preferred lower limit thereto is 5 parts by mass, and a more preferred upper limit thereto is 20 parts by mass.

The conductive composition resulting from incorporation of a conductive material into the fluororesin and/or fluorine-free organic material preferably has a surface resistance value of $1\times10^0$ to $1\times10^9$ $\Omega\cdot cm$. A more preferred lower limit is $1\times10^2$ $\Omega\cdot cm$, and a more preferred upper limit is $1\times10^8$ $\Omega\cdot cm$.

The "surface resistance value of the conductive composition" so referred to herein is the value obtained by charging the pellets obtained by melt kneading the conductive material and the fluororesin and/or fluorine-free organic material into a melt indexer, heating the charge in the melt indexer to a temperature arbitrarily selected within the range of 200 to 400° C., extruding the melt and measuring the surface resistance value of the extrudate strand using a battery-powered insulation-resistance meter.

In the practice of the invention, the layer [P] may further contain, in addition to the above-mentioned conductive material, one or more of various additives such as heat stabilizes and other stabilizers, reinforcing agents, fillers, ultraviolet absorbers and pigments, each at an addition level at which the object of the invention will not be defeated. By addition of such an additive or additives, the layer [P] can be improved in such characteristics as thermal stability, surface hardness, wear resistance, antistatic properties and weather resistance.

As for the method of introducing an adhesive functional group into the fluororesin and/or fluorine-free organic material, the method comprising carrying out the polymerization using a polymerization initiator having a desired adhesive functional group itself or a functional group convertible to an adhesive functional group, as described later herein, is generally employed. When the adhesive functional group contains a carbonyl group, for instance, the method comprising polymerizing the monomers mentioned above using a peroxydicarbonate as the polymerization initiator is preferred from the economical viewpoint and from the quality (including thermal stability, chemical resistance, etc.) viewpoint.

The layer [Q] is made of a chlorotrifluoroethylene copolymer (CTFE copolymer).

As a result of the use of a CTFE copolymer as the material of the layer [Q], the fluid transfer member of the invention acquires not only low water vapor permeability and gas barrier properties but also low chemical liquid permeability that has not been observed as a characteristic of PCTFE and, further, it can attain thermal stability on the occasion of molding, chemical resistance and stress cracking resistance as well.

The CTFE copolymer is preferably constituted of 2 to 98 mole percent of chlorotrifluoroethylene unit [CTFE unit] and 98 to 2 mole percent of a monomer [A] unit derived from a monomer [A] copolymerizable with CTFE (such copolymer is hereinafter sometimes referred to as "CTFE copolymer (I)").

Each "CTFE unit" so referred to herein is the segment [—CFCl—CF$_2$—] derived from chlorotrifluoroethylene and occurring in the molecular structure of the CTFE copolymer. Similarly, each "monomer (A) unit" is the segment derived from the monomer [A] by addition thereof to the molecular structure of the CTFE copolymer.

The monomer [A] is not particularly restricted but may be any monomer copolymerizable with CTFE. It may be one single species or two or more species. It includes TFE, Et, vinylidene fluoride [VdF], a PAVE, a vinyl monomer represented by the general formula (I):

$$CX^3X^4\!=\!CX^1(CF_2)_n\!-\!X^2 \qquad (I)$$

wherein $X^1$, $X^3$ and $X^4$ are the same or different and each represents hydrogen atom or fluorine atom, $X^2$ represents hydrogen atom, fluorine atom or chlorine atom and n represents an integer of 1 to 10), and an alkyl perfluorovinyl ether derivative represented by the general formula (III):

$$CF_2\!=\!CF\!-\!OCH_2\!-\!Rf \qquad (III)$$

(wherein Rf is a perfluoroalkyl group containing 1 to 5 carbon atoms), among others.

The monomer [A] preferably is at least one species selected from the group consisting of TFE, Et, VdF, PAVEs and vinyl monomers represented by the general formula (I).

The monomer [A] may comprise one single species or a combination of two or more species each of the genera PAVE, vinyl monomer of general formula (I) and/or alkyl perfluorovinyl ether derivative of general formula (III).

The vinyl monomer represented by the general formula (I) is not particularly restricted but includes, among others, HFP, perfluoro(1,1,2-trihydro-1-hexene), perfluoro(1,1,5-trihydro-1-pentene) and perfluoro(alkyl)ethylenes represented by the general formula (IV):

$$H_2C\!=\!CX^5Rf^5 \qquad (IV)$$

(wherein $X^5$ is H, F or CF$_3$ and Rf$^5$ is a perfluoroalkyl group containing 1 to 10 carbon atoms).

Preferred as the perfluoro(alkyl)ethylene is perfluoro(butyl)ethylene.

Preferred as the alkyl perfluorovinyl ether derivative represented by the general formula (III) are those in which Rf is a perfluoroalkyl group containing 1 to 3 carbon atoms. CF$_2$=CF—OCH$_2$—CF$_2$CF$_3$ is more preferred.

Also usable as the monomer [A] is an unsaturated carboxylic acid copolymerizable with CTFE.

The unsaturated carboxylic acid is not particularly restricted but includes unsaturated aliphatic carboxylic acids containing 3 to 6 carbon atoms, including unsaturated aliphatic polycarboxylic acids containing 3 to 6 carbon atoms, such as, for example, (meth)acrylic acid, crotonic acid, maleic acid, fumaric acid, itaconic acid, citraconic acids, mesaconic acid and aconitic acid.

The unsaturated aliphatic polycarboxylic acids are not particularly restricted but include, among others, maleic acid, fumaric acid, itaconic acid, citraconic acid, mesaconic acid and aconitic acid, and the acid anhydrides thereof when they can take an acid anhydride form, such as maleic acid, itaconic acid and citraconic acid.

While the monomer [A] may comprise two or more species, the combined use of itaconic acid, citraconic acid, and/or the acid anhydride thereof may not be necessary when one of the species comprises VdF, a PAVE and/or HFP.

The PAVE used as the monomer [A] is conceptually the same as the PAVE in the TFE/PAVE copolymer constituting the layer [P], and those PAVEs represented by the general formula (II) given above are preferred and PMVE, PEVE or PPVE is more preferred.

The above-mentioned CTFE copolymer is more preferably a CTFE copolymer constituted of CTFE unit, tetrafluoroethylene unit [TFE unit] and a monomer [B] unit derived from a monomer [B] copolymerizable with CTFE and TFE (such copolymer is hereinafter sometimes referred to as "CTFE copolymer (II)").

Each "TFE unit" so referred to herein is the segment [—CF$_2$—CF$_2$—] derived from tetrafluoroethylene and occurring in the molecular structure of the CTFE copolymer (II). Similarly, each "monomer (B) unit" is the segment derived from the monomer [B] by addition thereof to the molecular structure of the CTFE copolymer.

The monomer [B] is not particularly restricted but may be any monomer containing one or more fluorine atoms within the molecule thereof and copolymerizable with CTFE and TFE. As examples, there may be mentioned those enumerated hereinabove referring to the monomer [A], excluding TFE.

The monomer [B] preferably comprise at least one species selected from the group consisting of Et, VdF, a PAVE and a vinyl monomer represented by the general formula (I) given hereinabove.

In the CTFE copolymer (II), the monomer [B] unit preferably amounts to 10 to 0.1 mole percent and the sum of the CTFE unit and the TFE unit amounts to preferably 90 to 99.9 mole percent. At monomer [B] unit content levels below 0.1 mole percent, the resulting copolymer tends to be inferior in moldability, environmental stress cracking resistance and stress cracking resistance and, at levels exceeding 10 mole percent, the copolymer tends to be inferior in low chemical liquid permeability, thermal stability, and mechanical characteristics.

When the monomer [B] is a PAVE, a more preferred lower limit to the monomer [B] unit content is 0.5 mole percent, a more preferred upper limit thereto is 5 mole percent and a still more preferred upper limit thereto is 3 mole percent.

The monomer [A] unit content in the CTFE copolymer of the invention is the value obtained by such an analytical technique as $^{19}$F—NMR and, more specifically, is the value obtained by appropriately selecting or combining NMR spectrometry, infrared spectrophotometry [IR], elemental analysis and/or fluorescent X ray analysis according to the monomer species.

The CTFE copolymer constituting the layer [Q] may be a binary copolymer or a terpolymer or further multicomponent copolymer. As the binary copolymer, there may be mentioned CTFE/TFE copolymer, CTFE/PAVE copolymer, CTFE/VdF copolymer, CTFE/HFP copolymer and CTFE/Et copolymer, among others. As the terpolymer (ternary polymer) and further multicomponent copolymers, there may be mentioned CTFE/TFE/HFP copolymer, CTFE/TFE/VdF copolymer, CTFE/TFE/PAVE copolymer, CTFE/TFE/HFP/PAVE copolymer and CTFE/TFE/VdF/PAVE copolymer, among others. Among them, CTFE/TFE/PAVE copolymer hd preferred.

The CTFE copolymer mentioned above may be a copolymer of CTFE and Et and/or a fluoromonomer. As a CTFE copolymer having such a copolymer composition, there may be mentioned, for example, CTFE/TFE/Et copolymer and CTFE/TFE/Et/PAVE copolymer.

The above CTFE copolymer may be a polymer constituting either a resin or an elastomer, and preferably is a resin-constituting one.

The above CTFE copolymer can be obtained by any of the polymerization methods known in the art, for example bulk polymerization, solution polymerization, emulsion polymerization and suspension polymerization. However, it is preferably one obtained by suspension polymerization.

The above CTFE copolymer preferably has a melting point [Tm] of 150 to 300° C. A more preferred lower limit is 160° C., a still more preferred lower limit is 170° C., and a more preferred upper limit is 290° C.

The melting point [Tm] is the temperature corresponding to the melting peak as observed upon raising the temperature at a rate of 10° C./minute using a differential scanning calorimeter [DSC].

The CTFE copolymer mentioned above, when subjected to a heating test, preferably shows a temperature [Tx] of not lower than 370° C. at which 1% by mass of the CTFE copolymer is decomposed. A more preferred lower limit is 380° C. and a still more preferred lower limit is 390° C. Within the above range, an upper limit to the above-defined thermal decomposition temperature [Tx] may be set at 450° C., for instance.

The thermal decomposition temperature [Tx] is the value obtained by using an apparatus for thermogravimetry/differential thermal analyzer [TG-DTA] and measuring the temperature at which the loss in mass of the CTFE copolymer subjected to the heating test amounts to 1% by mass.

The above CTFE copolymer preferably shows a difference [Tx−Tm] of 150° C. or greater between the melting point [Tm] and the temperature [Tx] causing 1% by mass decomposition of the CTFE copolymer. When such difference is smaller than 150° C., the temperature range within which molding is possible becomes so narrow that the range of choice of molding conditions becomes narrow. Because of its broad temperature range within which molding is possible, as mentioned above, the CTFE copolymer mentioned above, when subjected to coextrusion molding, can be coextruded with a high-melting polymer as the counterpart. A more preferred lower limit to the above difference [Tx−Tm] is 170° C. Within the above range, an upper limit to the difference [Tx−Tm] may be set at 210° C., for instance, since the range of choice of molding conditions is sufficiently broad then.

The CTFE copolymer mentioned above, when tested in the form of a sheet for measurement, preferably shows a 35% (by mass) hydrochloric acid permeability coefficient of not higher than $2.5 \times 10^{-13}$ (g·cm)/(cm$^2$·sec). A more preferred upper limit to the 35% (by mass) hydrochloric acid permeability coefficient is $1.5 \times 10^{-13}$ (g·cm)/(cm$^2$·sec) and a still more preferred upper limit is $1.0 \times 10^{-13}$ (g·cm)/(cm$^2$·sec). A preferred lower limit to the hydrochloric acid permeability coefficient of the sheet for measurement can be set, within the above range, at $0.001 \times 10^{-13}$ (g·cm)/(cm$^2$·sec), for instance.

The sheet for measurement is a 0.2-mm-thick sheet obtained by compression molding of the CTFE copolymer of the invention at a molding temperature higher by 50° C. than the melting point and at a molding pressure of 5 MPa.

The above CTFE copolymer preferably shows a ratio [Px/Py] of not higher than 0.7 of the 35% (by mass) hydrochloric acid permeability coefficient [Px] of the multilayer tube (A) for measurement to the 35% (by mass) hydrochloric acid permeability coefficient [Py] of a monolayer tube (a) for comparison. A more preferred upper limit to the above ratio [Px/Py] is 0.5 and a more preferred upper limit is 0.2. Within the above range, a preferred lower limit to the ratio [Px/Py] may be set at 0.001, for instance.

The laminated tube (A) for measurement is a tube obtained by feeding the CTFE copolymer of the invention as an outer layer-forming polymer, together with a tetrafluoroethylene/perfluoro(propyl vinyl ether) copolymer [PFA] when the CTFE copolymer has a melting point exceeding 210° C., or a tetrafluoroethylene/perfluoro(methyl vinyl ether) copolymer [MFA] when the CTFE copolymer has a melting point not higher than 210° C., as an inner layer-forming polymer, to a multilayer extruder and carrying out multilayer extrusion molding at an inner layer cylinder temperature of 380° C., an outer layer cylinder temperature higher by 75 to 105° C. than the melting point of the CTFE copolymer of the invention and a die temperature of 395° C. when the CTFE copolymer has a melting point exceeding 210° C., or at an inner layer cylinder temperature of 270° C., an outer layer cylinder temperature higher by 75 to 90° C. than the melting point of the CTFE copolymer of the invention and a die temperature of 290° C. when the CTFE copolymer has a melting point not higher than 210° C., at a take-off speed of 0.5 m/minute, with the outer layer thickness amounting to 12.6% of the sum of the outer layer thickness and inner layer thickness. The monolayer tube (a) for comparison is a tube obtained by using a tetrafluoroethylene/perfluoro(alkyl vinyl ether) copolymer under the same conditions as employed in preparing the laminated tube (A) for measurement except that the CTFE copolymer is not used; it is equal in thickness to the inner layer of the laminated tube (A) for measurement.

The above CTFE copolymer preferably shows a ratio [Pz/Py] of not higher than 0.7 of the 35% (by mass) hydrochloric acid permeability coefficient [Pz] of the tube (B) for measurement to the 35% (by mass) hydrochloric acid permeability coefficient [Py] of a monolayer tube (b) for comparison. A more preferred upper limit to the above ratio [Pz/Py] is 0.5 and a more preferred upper limit is 0.2. Within the above range, a preferred lower limit to the ratio [Pz/Py] may be set at 0.001, for instance.

The tube (B) for measurement is a tube obtained after subjecting the above-mentioned laminated tube (A) for measurement to pressure testing, and the monolayer tube (b) for comparison is a tube obtained after subjecting the above-mentioned monolayer tube (a) for comparison to the pressure testing.

The pressure testing is a test conducted by cutting the tube (A) for measurement and the monolayer tube (a) for comparison each to a length of 30 cm, sealing one end of each tube segment with a cap manufactured by Swagelok, filling the resulting tube with pure water, connecting the other end to a pump to thereby construct a pressurizing apparatus, and subjecting the whole pressuring apparatus to $10 \times 10^4$ cycles of an intermittent pressurizing procedure at 0 to 2 MPa for 1 second/cycle in a constant-temperature vessel adjusted to a temperature of 25° C.

When it is to be melt-molded at a molding temperature of 300° C. or above, the above-mentioned CTFE copolymer preferably contains not more than 80 unstable terminal groups per $10^6$ carbon atoms. When the number of such groups exceeds 80, blowing tends to occur in the step of melt molding at a molding temperature of 300° C. or above. A more preferred upper limit is 40, a still more preferred upper limit is 20, and a particularly preferred upper limit is 6. The number of unstable terminal groups may be reduced, within the above range, to 1, for instance, from the detection limit viewpoint.

In the case of melt molding at a molding temperature lower than 300° C., the number of unstable terminal groups preferably exceeds 80 per $10^6$ carbon atoms. When that number is not larger than 80 per $10^6$ carbon atoms in the case of melt molding at a molding temperature below 300° C., the adhesiveness may decrease in certain cases. A more preferred lower limit is 100, a still more preferred lower limit is 150, a particularly preferred lower limit is 180 and a most preferred lower limit is 220. When the number of unstable terminal groups is within the above range in the case of melt molding at a molding temperature lower than 300° C., an upper limit may be set, for example, at 500 from the productivity viewpoint.

The above-mentioned number of unstable terminal groups is the value obtained by carrying out measurements using an infrared spectrophotometer [IR], as described hereinabove.

In the case of melt molding or heat treatment at a temperature lower than 300° C., the above-mentioned CTFE copolymer preferably contains an adhesive functional group or groups. The term "adhesive functional group" as used herein means a group which constitutes a part of the molecular structure of a polymer contained in the CTFE copolymer and is capable of participating in the adhesion between the CTFE copolymer and a substrate. The adhesive functional group may be any moiety capable of being involved in such adhesion and includes, within the meaning thereof, those generally called functional groups but also those generally called bonds such as ether bonding.

The adhesive functional group is not particularly restricted but may be any of those capable of being involved in fluororesin-substrate adhesion, including carbonyl, hydroxyl and amino groups, among others. The "carbonyl group" so referred to herein is a divalent carbon-containing group comprising a carbon-oxygen double bond, typically the group represented by —C(=O)—. The carbonyl group is not particularly restricted but may be, for example, a carbonate group, haloformyl group, formyl group, carboxyl group, ester bond [—C(=O)O—], acid anhydride bond [—C(=O)O—C(=O)—], isocyanato group, amide group, imide group [—C(=O)—NH—C(=O)—], urethane bond [—NH—C(=O)O—], carbamoyl group [NH$_2$—C(=O)—], carbamoyloxy group [NH$_2$—C(=O)O—], ureido group [NH$_2$—C(=O)—NH—] or oxamoyl group [NH$_2$—C(=O)—C(=O)—], or a like one constituting a part of the chemical structure.

The above-mentioned carbonate group is represented by —OC(=O)O—R$^1$ (in which R$^1$ represents an organic group). As the organic group R$^1$ in the above formula, there may be mentioned, for example, alkyl groups containing 1 to 20 carbon atoms, ether bond-containing alkyl groups containing 2 to 20 carbon atoms, etc.; among them, alkyl groups containing 1 to 8 carbons, ether bond-containing alkyl groups containing 2 to 4 carbon atoms and the like are preferred. For example, —OC(=O)OCH$_3$, —OC(=O)OC$_3$H$_7$, —OC(=O)OC$_8$H$_{17}$, —OC(=O)OCH$_2$CH$_2$CH$_2$OCH$_2$CH$_3$ and the like may be mentioned as preferred examples.

The amide group mentioned above is a group represented by the general formula:

(wherein R$^2$ represents hydrogen atom or an organic group and R$^3$ represents an organic group).

The hydrogen atom or atoms each bound the nitrogen atom in the above-mentioned amide group, imide group, urethane bond, carbamoyl group, carbamoyloxy group, ureido group or oxamoyl group, for instance, each may be substituted by a hydrocarbon group such as an alkyl group.

Preferred as the adhesive functional group are amide, carbamoyl, hydroxyl, carboxyl and carbonate groups since these are easy to introduce and the coatings obtained show proper thermal stability and good adhesion at relatively low temperatures; among them, carbonate groups are preferred.

When the CTFE copolymer is an adhesive functional group-containing one, the copolymer may comprise a polymer containing an adhesive functional group or groups at one or each main chain terminus or on one or more side chains or a polymer containing such groups at one or each main chain terminus and in one or more side chains. When the polymer main chain is an adhesive functional group-terminated one, each of the both termini of the main chain may have such group, or only either one of the termini may have such group. When the CTFE copolymer contains such an adhesive functional group or groups as mentioned above at one or each main chain terminus and/or in a side chain(s) and/or contains an adhesive functional group or groups each in the structural form generally called a bond such as an ether bond, such adhesive functional group or groups may be contained in the main chain. That the CTFE copolymer comprising a polymer whose main chain is an adhesive functional group-terminated one is preferred for the reason that such group or groups will not markedly lower the mechanical characteristics or chemical resistance of the copolymer and for reasons of advantageousness from the productivity and cost viewpoint.

The CTFE copolymer which comprises a polymer having adhesive functional group-containing side chains can be obtained by copolymerizing an adhesive functional group-containing monomer with a fluoromonomer and/or a fluorine-free monomer, with each monomer species and the monomer composition being selected according to the desired fluororesin. The term "adhesive functional group-containing monomer" as used herein means a monomer containing an adhesive functional group. The adhesive functional group-containing monomer may or may not contain a fluorine atom(s). Since, however, the above-mentioned fluoromonomer and fluorine-free monomer have no adhesive functional group and, in this respect, are conceptually distinguished from the adhesive functional group-containing monomer which has an adhesive functional group.

Preferred as the adhesive functional group-containing monomer are unsaturated compounds represented by the general formula (IV):

$$CX^2_2=CY^2-(Rf^4)_n-Z^2 \qquad (IV)$$

(wherein Z$^2$ represents a hydroxyl, carbonyl or amino group-containing functional group, X$^2$ and Y$^2$ are the same or different and each represents hydrogen atom or fluorine atom, Rf$^4$ represents an alkylene group containing 1 to 40 carbon atoms, a fluorine-containing oxyalkylene group containing 1 to 40 carbon atoms, an ether bond-containing fluoroalkylene group containing 1 to 40 carbon atoms or an ether bond-containing, fluorine-containing oxyalkylene group containing 1 to 40 carbon atoms and n represents 0 or 1). By saying "hydroxyl, carbonyl or amino group-containing functional group" herein, it is meant that the functional group in question may be a hydroxyl group or a carbonyl group or an amino group or a functional group containing any of these adhesive functional groups.

The adhesive functional group-containing monomer may also be an unsaturated dibasic acid monoester, vinylene carbonate, maleic anhydride or maleic acid, for instance.

The CTFE copolymer, when it comprises a polymer whose main chain is an adhesive functional group-terminated one in which the adhesive functional group is a carbonate group, can be obtained by a method of polymerization using a peroxycarbonate as the polymerization initiator. The use of such method is preferred in view of the fact that the carbonate group introduction and the control of such introduction are very easy to make and also from the economical viewpoint and from the viewpoint of quality, including thermal stability and chemical resistance, among others.

Preferred as the peroxycarbonate are compounds represented by one of the following formulas:

(In the above formulas, $R^4$ and $R^5$ are the same or different and each represents a straight or branched monovalent saturated hydrocarbon group containing 1 to 15 carbon atoms or an alkoxyl group-terminated straight or branched monovalent saturated hydrocarbon group containing 1 to 15 carbon atoms, and $R^6$ represents a straight or branched divalent saturated hydrocarbon group containing 1 to 15 carbon atoms or an alkoxyl group-terminated straight or branched divalent saturated hydrocarbon group containing 1 to 15 carbon atoms.)

Preferred as the peroxycarbonate, among others, are diisopropyl peroxycarbonate, di-n-propyl peroxydicarbonate, tert-butylperoxy isopropyl carbonate, bis(4-tert-butylcyclohexyl) peroxydicarbonate and di-2-ethylhexyl peroxydicarbonate.

When the CTFE copolymer comprises a polymer whose main chain is an adhesive functional group-terminated one in which the adhesive functional group is other than a carbonate group, a peroxide-derived adhesive functional group can be introduced therein, like in the case of the above-mentioned carbonate group introduction, by carrying out the polymerization using such a peroxide as a peroxycarbonate, peroxydicarbonate, peroxy ester or peroxyalcohol as the polymerization initiator. By saying "peroxide-derived", it is meant that the functional group in question is introduced directly from a functional group contained in the peroxide or indirectly by conversion of the functional group introduced directly from the functional group contained in the peroxide.

The level of addition of the polymerization initiator such as a peroxycarbonate or peroxy ester is preferably 0.05 to 20 parts by mass per 100 parts by mass of the polymer to be obtained, although it may vary depending on the kind, composition and molecular weight of the desired fluororesin, the polymerization conditions and the initiator species used, among others. A more preferred lower limit is 0.1 part by mass, and a particularly preferred upper limit is 10 parts by mass.

The CTFE copolymer mentioned above may contain one or more of such additives as fillers, pigments, electrically conductive materials, heat stabilizers, reinforcements and ultraviolet absorbers and, in the case of a rubber, the copolymer may contain one or more of such additives as crosslinking agents, acid acceptors, curing agents, curing promoters and curing catalysts.

As the electrically conductive materials among the additives, there may be mentioned, for example, carbon fibrils described in U.S. Pat. No. 4,663,2330 and Japanese Kokai Publication H03-174018, among others.

The fillers and other additives mentioned above are preferably used at addition levels within the respective ranges within which the properties of the CTFE copolymer will not be deteriorated.

A fluororesin-based conductive composition resulting from incorporation of an electrically conductive material into the CTFE copolymer preferably has a surface resistance value of $1\times10^0$ to $1\times10^9$ Ω·cm. A more preferred lower limit is $1\times10^2$ Ω·cm, and a more preferred upper limit is $1\times10^8$ Ω·cm.

In the above-mentioned laminate constituting the fluid transfer member of the invention, the layer [P] and layer [Q] may or may not be in contact with each other and, when they are in contact with each other, they may or may not be in close contact with each other.

The laminate in the fluid transfer member of the invention may be constituted of the layer [P] and layer [Q] alone or may further comprise at least one further layer other than the layer [P] or layer [Q]. The other layer is not particularly restricted but includes, among others, a protective layer, a coloring layer, a marking layer, and a dielectric layer for antistatic purposes. In view of the function thereof, the protective layer or dielectric layer, for instance, preferably constitutes the outermost layer in the fluid transfer member.

The above-mentioned laminate constituting the fluid transfer member of the invention may have a laminated structure comprising the layer [P] and layer [Q] and an inorganic layer as the other layer. The inorganic layer comprises an inorganic material. The inorganic layer preferably has an inorganic matter content of not lower than 50% by mass. When the inorganic matter content is lower than 50% by mass, the laminate may be poor in gas barrier properties in some cases. From the gas barrier performance viewpoint, a more preferred lower limit to the inorganic matter content in the inorganic layer is 80% by mass, and a still more preferred lower limit thereto is 90% by mass, particularly preferably 100% by mass. In certain cases, however, a small amount of an organic material may get mixed in on the occasion of formation of the inorganic layer and, therefore, from the commercial productivity viewpoint, the inorganic matter content may be 95% by mass or lower, preferably 99% by mass or lower. The "inorganic matter content" so referred to herein is the content of an inorganic material(s) among the components contained in the inorganic layer. The "inorganic matter content" so referred to herein is the value obtained by measuring the change in mass before and after ashing when the inorganic film or membrane is sufficiently thick to be separated off by peeling and, when the inorganic film or membrane is too thin to be peeled off, it is the value obtained upon surface analysis by electron spectroscopy for chemical analysis [ESCA] or attenuated total reflection infrared spectrometry [ATR-IR], for instance.

The inorganic material is preferably one capable of providing the product fluorine-containing molded article with gas barrier properties (hereinafter, such material is sometimes referred to as "gas barrier inorganic material"). As the gas barrier inorganic material, there may be mentioned, for example, metals such as aluminum, silicon, titanium, zinc, zirconium, magnesium, tin, copper and iron; oxides, nitrides and fluorides of such metals and other metal compounds; and carbon species such as diamond-like carbon [DLC]. The gas barrier inorganic material may comprise one single species or two or more species.

Among such gas barrier inorganic materials as mentioned above, aluminum oxide, silicon oxide and DLC are preferred in view of their transparency and good gas barrier properties. From the good gas barrier properties viewpoint, aluminum oxide and silicon oxide are preferred as the gas barrier inorganic material and, from the chemical resistance viewpoint and, in the case of the fluorine-containing molded article having a curved shape, DLC is more preferred from the viewpoint that such curved shape can be efficiently formed by the plasma chemical vapor deposition method [plasma CVD method], which is to be described later herein. The above-mentioned aluminum oxide is a compound represented by $AlO_x$ (x representing a number of 0.5 to 1.5), and the above-mentioned silicon oxide is a compound represented by $SiO_y$ (y representing a number of 0.5 to 2). As the molded article having a curved shape, there may be mentioned, for example, tubular, hose-like and like cylindrical ones.

When the gas barrier inorganic material is DLC, the inorganic film is generally a film formed of hard carbon called i-carbon or hydrogenated amorphous carbon (a-C:H) mainly by $sp^3$ bonding among carbon atoms; it is noncrystalline and has a high refractive index and a very smooth morphology. The structure of this DLC film can generally be analyzed by the following method. Based on a Raman spectrum thereof, the ratio between $sp^2$ bonds and $sp^3$ bonds is evaluated from the relative Raman spectrum intensity ratio between two separated bands, namely the D band at around 1390 $cm^{-1}$ and the G band at around 1530 $cm^{-1}$, namely the ratio ($I_D/I_G$). In short, it is said that a lower $I_D/I_G$ ratio value indicates a greater abundance in $sp^3$ bonds (Reference Document: Naoyuki Yamamoto: Tribologist, Vol. 41, No. 9, p. 760 (1996)).

Further, a DLC film generally contains an element(s) other than carbon, and the concentration of hydrogen and other elements contained in the DLC layer is influenced by the raw material gas species used as the carbon source, the amounts of impurities and the amounts of additives in the plasma forming atmosphere, the plasma formation conditions, and the way of electrode disposition, among others. When, for example, the raw material gas used as the carbon source contains hydrogen, the DLC film obtained generally contains not more than 7% by mass of hydrogen. When the raw material gas used as the carbon source contains oxygen or when the degree of vacuum is low during plasma formation, oxygen in the raw material gas or oxygen in the air may be fixed in the DLC film and this is unfavorable from the gas barrier performance viewpoint. The oxygen content in the DLC film is preferably not higher than 5% by mass.

The inorganic layer preferably has a thickness of $5 \times 10^{-9}$ to $1 \times 10^{-6}$ m. At thickness levels below $5 \times 10^{-9}$ m, the layer is too thin, so that the gas permeability may be high in some instances. At levels exceeding $1 \times 10^{-6}$ m, the pliability and flexibility become poor, so that some shapes are susceptible to cracking and the gas permeability becomes high in certain cases. From the gas permeability viewpoint, a more preferred lower limit to the thickness of the inorganic layer is $1 \times 10^{-8}$ m, and a more preferred upper limit thereto is $1 \times 10^{-7}$ m and a still more preferred upper limit is $8 \times 10^{-8}$ m. From the pliability, flexibility and transparency viewpoint, a particularly preferred upper limit to the thickness of the inorganic layer is $7 \times 10^{-8}$ m.

The inorganic layer thickness referred to herein is the value obtained by the measurement method described below, since the actual inorganic layer thickness on the fluorine-containing molded article obtained cannot be measured because of the occurrence of surface irregularities, about several $10 \times 10^{-10}$ m high or deep, on the fluorine-containing molded article. Thus, simultaneously with the inorganic layer formation on the fluorine-containing molded article, an inorganic layer is formed on a silicon wafer partly masked beforehand with a Kapton (registered trademark) adhesive tape. After taking out, the difference in level between the masked portion and unmasked portion is measured using a Talystep profilometer (product of Taylor Hobson). The thickness of the inorganic layer formed on the silicon wafer is regarded as the thickness of the inorganic layer on the fluorine-containing molded article.

The inorganic layer is preferably one excellent in transparency for some fields of application of the fluorine-containing molded article obtained. The inorganic layer preferably has a haze value not exceeding 30%, more preferably not exceeding 20%. So long as the haze value is within the range given above, the inorganic layer may have a haze value of 0.5% or above or, further, 1% or above, since a transparency level generally required is retained then. The inorganic layer as one excellent in transparency preferably is a rather thin one, and such a DLC layer as mentioned above is preferred. The haze value referred to herein is the value measured according to JIS K 7136 using a haze meter (direct reading haze meter, product of Toyo Seiki Seisakusho).

The laminate in the fluid transfer member of the invention is preferably constituted of the layer [P] and layer [Q] alone.

In the laminate of the invention, it is not always necessary that the boundary between the layers in contact with each other be definite. The layer structure may have a concentration gradient as a result of mutual invasion of polymer chains constituting both layers and in contact with one another at the interface from one layer to the other layer.

The fluid to be transferred through the fluid transfer member of the invention may be either a gas or a liquid, and the liquid may be a volatile liquid. It may further be a fluid containing fine solid particles such as abrasive particles.

The above-mentioned fluid is not particularly restricted but includes, among others, food and drink, for example milk, gases and liquid chemicals.

The gases are not particularly restricted but include, for example, ozone, hydrogen, oxygen and low-molecular fluorocarbons, and the gases enumerated here may be gases used in the field of semiconductor manufacture.

The above-mentioned liquid chemicals are not particularly restricted but include, among others, organic acids such as acetic acid, formic acid, cresol and phenol; inorganic acids such as hydrofluoric acid, sulfuric acid, nitric acid, phosphoric acid and hydrochloric acid; peroxides such as aqueous hydrogen peroxide; mixed liquids composed of such an inorganic acid as mentioned above and aqueous hydrogen peroxide, for example phosphoric acid-aqueous hydrogen peroxide and sulfuric acid-aqueous hydrogen peroxide; alkaline solutions such as sodium hydroxide solutions, potassium hydroxide solutions and aqueous ammonia; alcohols such as methanol and ethanol; amines such as ethylenediamine, diethylenetriamine and ethanolamine; amides such as dimethylacetamide; esters such as ethyl acetate and butyl acetate; hydrocarbon solvents such as xylene; chlorinatd solvents such as trichloroethylene; ketones such as acetone; ozonated water; ultrapure water; functional water; and mixtures of two or more of these liquids. The functional water mentioned above is a liquid resulting from dissolution of hydrogen and ammonia in ultrapure water and is used in the field of semiconductor manufacture.

The method of forming the laminate constituting the fluid transfer member of the invention is not particularly restricted but includes, for example, (1) the method comprising coextruding the material of the layer [P] and the material of the layer [Q], (2) the method comprising melt extruding the outer tube-constituting polymer material onto the inner tube formed in advance to cover the same, and (3) the method comprising forming the inner and outer tubes in advance and inserting the inner tube into the outer tube, followed by fusion bonding by heating. Either the above method (1) or the above method (2) may be employed according to the materials employed and the shape of the desired fluid transfer member; the method (1) is preferred, however. When the fluid transfer member is tube-like, the method (2) is preferred in certain fields of use. In the above methods (1) and (2), the layer [P] can be applied as the inner tube, and the layer [Q] as the outer tube.

The layer [P] is preferably the innermost layer corresponding to the portion coming in contact with the fluid in the fluid transfer member of the invention. When used as the innermost layer, the fluoropolymer can fully display such characteristics thereof as chemical resistance.

The laminate of the invention may take various forms, film-like, sheet-like, tube-like, hose-like, bottle-like, tank-like, etc. The film-like, sheet-like, tube-like and hose-like forms may also be corrugated or convoluted.

The fluid transfer member of the invention is not particularly restricted but includes, among others, tubing/piping materials such as tubes (pipes) and joints, and films for use in diaphragm pumps.

Since it can fully display those excellent characteristics of the CTFE copolymer, such as chemical resistance, moldability and low liquid chemical permeability, the fluid transfer member of the invention is preferably used as a member in semiconductor manufacturing equipment, more preferably as a tube for semiconductor manufacturing equipment, a sheet for semiconductor manufacturing equipment or a film for semiconductor manufacturing equipment. The sheet for semiconductor manufacturing equipment or the film for semiconductor manufacturing equipment is preferably used in diaphragm pumps.

Since it can fully display those excellent characteristics of the CTFE copolymer, the above-mentioned fluid transfer member can also be used as a container for a liquid chemical by molding into the form of a bag/sac or tank. It can also be used as a lining member for liquid chemical containers, waste liquid tanks, etc.

When the fluid transfer member is a lined tubular body, it is a problem in the art that in the case of there being a space between the lining layer and tubular body (in the case of loose piping), that portion of a liquid chemical which has permeated the lining layer reacts with the metal substrate to form hydrogen gas, the pressure of which causes expansion of the lining layer toward the inside, making it no more possible to secure an appropriate rate of flow. In cases where the lining layer is in close contact with the tubular body through the intermediary of an adhesive layer, the gas deteriorates the adhesive layer to cause outgassing, which in turn produces such an expansion problem as mentioned above and causes corrosion of the metallic tubular body as well. In the worst case, through holes are formed in the metallic tubular body, allowing the occurrence of an inflow of rainwater. On the contrary, when the low permeability material of the invention is applied, the amount of lining layer-permeating liquid chemicals can be markedly reduced, so that the life of the lined tubular body can be prolonged. As the forms applicable here, there may be mentioned tubes and sheets, among others, and these can be obtained mainly by extrusion molding.

In the case of tanks in the form of lined cans or drums, too, the use of a highly permeating liquid chemical causes the same problems as mentioned above due to the liquid chemical that has permeated. By applying the low permeability material of the invention, however, it is possible to prolong the life of the tanks. On the other hand, the low permeability material of the invention can show a peel strength of not lower than 15 N/cm against metal substrates such as iron or SUS stainless steel substrates when only a slight contact pressure is applied thereto at an appropriate temperature and, therefore, the use of an adhesive layer can be omitted, which contributes to cost reduction in tank manufacture. On that occasion, the temperature in question is preferably 190 to 250° C., and the means of heating includes, but is not limited to, a hot air heater and a heating iron, among others. The use of a heating iron on the occasion of pressure application can also result in simplification of the operational procedure. The pressure is preferably not lower than 0.05 MPa. The peel strength evaluation is preferably carried out according to JIS C 5016.

Generally, buffer tanks are often constituted of a single resin alone and, when the low permeability resin of the invention is applied as that resin, the liquid chemical permeation can be reduced and, accordingly, the damaging of peripheral members can be reduced. Such tanks can be obtained by blow molding or rotomolding, for instance, and the MFR of the resin is preferably 1 to 3 g/10 minutes for blow molding and, for rotomolding, it is preferably 4 to 8 g/10 minutes. For the molded article to have an increased thickness, the volatile matter content is preferably not higher than 0.08% by mass as expressed in terms of the volatile matter-due loss in weight after 1 hour of heating at 300° C.

While sensors are very important in controlling liquid chemical lines, detecting or sensing elements may be damaged and/or basic detection value levels may increase as a result of permeation of liquid chemicals and, therefore, the maintenance thereof is very complicated and also produces a cost problem. In the case of a pressure sensor, for instance, the deformation of a diaphragm disposed in a bypass line parallel to a liquid chemical flow line is detected by measurements using a metal-made pressure sensing device. However, the pressure-sensing device is corroded by permeation of the liquid chemical and normal detection becomes difficult. In the case of a piezoelectric element-driven diaphragm pump as well, in which a thin diaphragm is finely oscillated and which encounters similar problems, the liquid chemical that has permeated the diaphragm damages the piezoelectric element and thus causes troubles in normal functioning. In the case of a liquid chemical concentration sensor, by which the concentration of a liquid chemical is detected by detecting the increase or decrease in specific absorption by spectrophotometric means through a transparent tube, the basal detection level gradually rises with the penetration of the liquid chemical into the tube wall, if permeable, and eventually exceeds the detection range; this is another problem. By using the low permeability resin according to the invention, it is possible to reduce the influences of these problems. The conceivable shapes suited for such fields of application include, but are not limited to, tubes, sheets and diaphragms, among others, and an appropriate shape should be selected according to each method of detection.

For the passage of a liquid chemical, foreign matter removal by means of a filter is essential and, in the case of filter casings, in particular, the liquid chemical is often in a heated condition at a high temperature, so that the degree of penetration increases and the damage of the surrounding members is increased accordingly. For reducing the penetration of the liquid chemical, it becomes necessary to mold shaped articles increased in wall thickness; however, with the increase in wall thickness, cracking tends to occur more easily and, further, the deformation due to the own weight cannot be ignored any longer. By using the molded article according to the invention, it becomes possible to reduce the liquid chemical penetration even when the molded article is relatively thin-walled; in addition, that molded article is high in elastic modulus as compared with such resins in conventional use as PTFE, PFA and FEP and, therefore, the elastic deformation due to the own weight can be reduced. Such filter casings are mostly molded by injection molding and, therefore, the resin to be used preferably has a MFR of 10 to 20 g/10 minutes.

Effects of the Invention

The fluid transfer member of the invention, which has the constitution described above, has both stress cracking resistance and low chemical liquid permeability in a balanced manner and, at the same time, can have chemical resistance as well as thermal stability required in the step of molding.

BEST MODES FOR CARRYING OUT THE INVENTION

The following examples illustrate the present invention more specifically. These examples are, however, by no means limitative of the scope of the invention.

EXAMPLE 1

A jacketed mixing vessel-type polymerizer with a capacity of 400 kg of water was charged with 100 kg of demineralized pure water, and the inside space was sufficiently purged with pure nitrogen gas and then the nitrogen gas was eliminated by evacuation. Then, 200 kg of octafluorocyclobutane, 9.13 kg of chlorotrifluoroethylene [CTFE], 20 kg of tetrafluoroethylene [TFE] and 10 kg of perfluoro(propyl vinyl ether) [PPVE] were fed under pressure to the polymerizer, the temperature was adjusted to 35° C. and stirring was started. Thereto was added 0.5 kg of a 50% (by mass) methanolic solution of di-n-propyl peroxydicarbonate [NPP] to initiate the polymerization. During polymerization, the vessel inside pressure was maintained at 0.68 MPa while additionally feeding a monomer mixture prepared so that the composition thereof might be equal to the desired copolymer composition and, after carrying out the polymerization until arrival of the total additional charge amount at about 10% by mass relative to the solvent, the residual gases in the vessel were discharged, and the polymer formed was taken out, washed with demineralized pure water and dried to give 25.7 kg of a CTFE copolymer (A) as a granular powder. The CTFE copolymer A obtained was evaluated for the following physical characteristics. The results are shown in Table 2.

[Thermal Decomposition Starting Temperature]

Using a thermogravimetry-differential thermal analysis apparatus [TG-DTA] (trademark: TG/DTA 6200, product of Seiko Denshi), a sample (10 mg) was heated from room temperature at a rate of 10° C./minute, and the temperature required for the sample to lose 1% by mass of the mass thereof was determined and regarded as the decomposition starting temperature.

[Melting Point]

Using a differential scanning calorimeter [DSC] (trademark: RDC 220, product of Seiko Denshi), a sample (3 mg) was heated from room temperature at a rate of 10° C./minute, and the melting peak temperature was regarded as the melting point.

[MFR]

Using a melt indexer (product of Toyo Seiki Seisakusho), the mass of the copolymer allowed to flow out through a nozzle with an inside diameter of 2 mm and a length of 8 mm for 10 minutes as measured at a temperature higher by 70° C. than the melting point of the polymer under a load of 5 kg according to ASTM D 3307-01.

[Content of Each Comonomer]

The content of each monomer unit species was calculated by properly combining the techniques of NMR, FT-IR, elemental analysis and fluorescent X ray analysis according to the kind of component [A]. In the case of a CTFE-TFE-PPVE terpolymer, for instance, the content of each comonomer can be calculated using the analytical data obtained by $^{19}F$ NMR spectrometry and elemental analysis for carbon (C) and the following calculation formula:

$$x = \frac{1}{16.455}\left(11646.9 + 149.565z - \left(\frac{2402.2 + 36.033z}{0.01 \text{Mc}}\right)\right)$$
$$y = 100 - x - z$$

x: TFE content (mole percent), y: CTFE content (mole percent), z: PPVE content (mole percent), Mc: C content (wt %).

In the above formula, the PPVE content (z) can be determined by $^{19}F$ NMR spectrometry. The carbon (C) content (Mc) can be determined by elemental analysis. Using these values, the TFE content (x) and CTFE content (y) can further be calculated.

[35% (By Mass) Hydrochloric Acid Permeability Coefficient of the Sheet]

Figure 1:
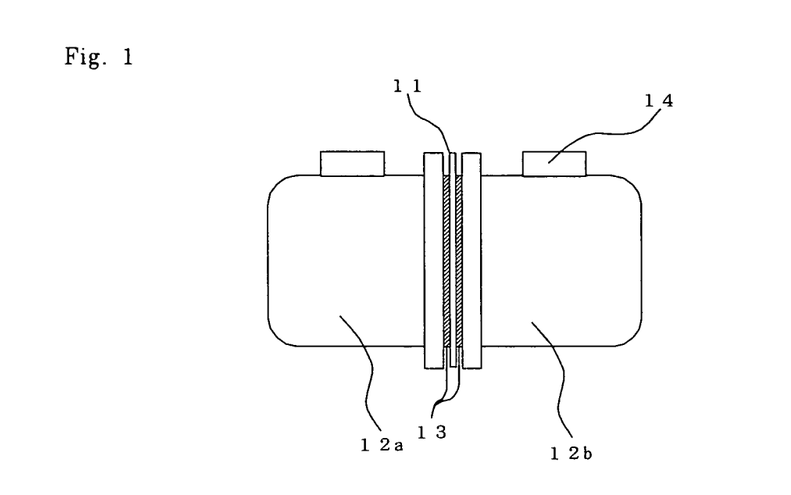
[FIG. 1] This figure is a schematic representation of the experimental apparatus used in testing sheets for 35% (by mass) hydrochloric acid permeability.

A sheet having a total thickness of 0.2±0.03 mm was obtained by compression molding of the copolymer at a molding temperature higher by 50 to 70° C. than the melting point thereof and at a molding pressure of 5 MPa. The sheet obtained was sandwiched between two glass vessels 12a and 12b (each having a capacity of 200 ml) shown in FIG. 1 in the middle thereof using fluororubber-made O rings 13. The vessel 12a on one side of the sheet was filled with 200 ml of 35% (by mass) hydrochloric acid and the other vessel 12b with 200 ml of pure water, and the whole was allowed to stand in a constant-temperature vessel at 25° C. (the area of the sample sheet 11 in contact with the liquids being 70 mm ø). After standing in this condition, about 1 ml was sampled from a sampling opening 14 of the pure water side vessel 12b and the chloride ion concentration Y (ppm) in the pure water side sample was determined using an ion chromatograph (trademark: IC 7000-E, product of Yokogawa Electric Corp.). The hydrochloric acid permeability coefficient X (g·cm)/(cm²·sec) was calculated as follows:

$$X = (\beta \times \text{specimen thickness})/\text{sectional area}$$

where β=gradient, in an α-versus-T plot, of the segment corresponding to the period ($T_\beta$) during which α shows straight-line changes relative to T;
α=total quantity permitted (unit: g)=Y×W×10$^{-6}$ (unit: g/sec);
W=amount of pure water (unit: ml);
T=elapsed time between the start of permeation testing and sampling (unit: sec);
specimen thickness=sheet thickness or tube wall thickness (unit: cm);
sectional area=area of that part of the sample sheet or tube which is in contact with pure water in the permeability testing apparatus (unit: cm²).

[MIT Folding Endurance of Sheet]

A sheet, 13 mm in width and 210 to 230 μm in thickness, of the CTFE copolymer or a PFA or PCTFE as molded at a molding temperature higher by 50 to 70° C. than the melting point and at a molding pressure of 5 MPa was repeatedly folded under the conditions prescribed in ASTM D 2176 using a MIT folding endurance tester (product of Toyo Seiki Seisakusho) and the number of repetitions of folding before fracture was counted. The results are shown in Table 2.

[Manufacture of Laminated Tube A]

Using a two-resin two-layer tube extruding machine equipped with a multimanifold die, a laminated tube (A) consisting of an outer layer made of the CTFE copolymer A and an inner layer made of a PFA (trademark: Neoflon AP231SH, product of Daikin Industries) was obtained by continuously molding a tube having an outside diameter of 19.1 mm, an inside diameter of 15.9 mm and an outer layer thickness of 0.2 mm by feeding the CTFE copolymer A and PFA, each as pellets, to the outer layer extruder and inner layer extruder, respectively. The temperature conditions on that occasion of molding are shown in Table 2.

[Copolymer A-to-PFA Adhesion Strength Measurement]

Test specimens, 1 cm in width, were cut out from the laminated tube A and subjected to a 180° peel test on a Tensilon universal testing machine at a rate of 25 mm/minute, and the initial adhesion strength (N/cm) was determined as the mean of five maximum points in elongation-tensile strength graphs. The result is shown in Table 2.

[Copolymer A-to-FEP Adhesion Strength Measurement]

The CTFE copolymer and a FEP resin (trademark: Neoflon FEP NP30, product of Daikin Industries) were subjected to compression molding at a temperature higher by 50 to 70° C. than the melting point of the resin higher in melting point and at a molding pressure of 5 MPa to give a sheet having a total thickness of 0.5±0.05 mm. The sheet obtained was subjected to compression molding at a molding pressure of 0.2 MPa and a molding temperature of 340° C. Test specimens, 1 cm in width, were cut out from this compression molded sample having a laminated structure and subjected to a 180° peel test one a Tensilon universal testing machine at a rate of 25 mm/minute, and the initial adhesion strength (N/cm) was determined as the mean of five maximum points in elongation-tensile strength graphs.

[Preparation of Laminated Tube B]

The laminated tube A was cut to a length of 30 cm, one end was sealed with a Swagelok cap and, after filling with pure water, a pump was connected to the other end to constitute a pressing apparatus. The whole pressing apparatus was placed in a constant-temperature vessel adjusted at a temperature of 25° C. Then, repeated pressurization testing of the laminated tube A was started under automatic control so that a 1 second/cycle pressurization/pressure release procedure (from 0 to 2 MPa) might be carried out. After $10^5$ pressurization/pressure release cycles, the pump was stopped, and the tube was taken off and dried. This is referred to as "laminated tube B".

[35% (By Mass) Hydrochloric Acid Permeability Coefficients of the Laminated Tubes A and B]

Figure 2:
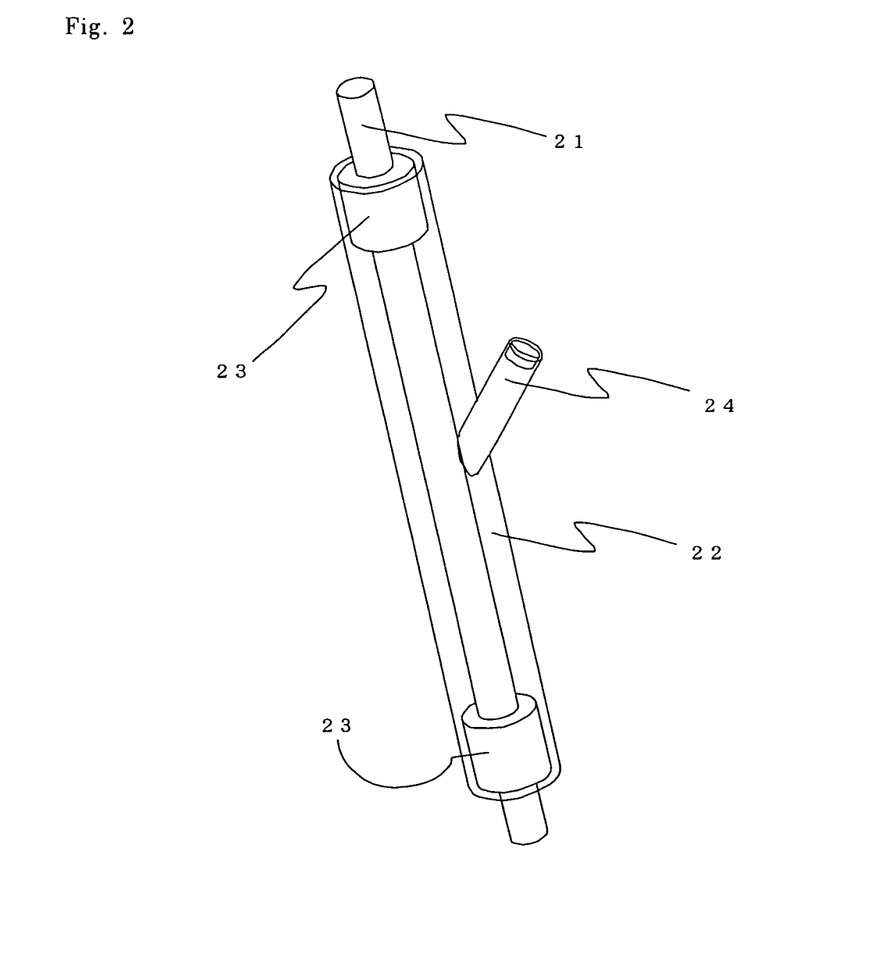
[FIG. 2] This figure is a schematic representation of the experimental apparatus used in testing tubes for 35% (by mass) hydrochloric acid permeability.

The 35% (by mass) hydrochloric acid permeability coefficients of the laminated tubes A and B specified in Table 2 were determined by the following method, which is illustrated in FIG. 2. First, each laminated tube was cut to a length of 30 cm, one end of the tube 21 was thermally melt-sealed, 52 ml of 35% (by mass) hydrochloric acid was placed in the tube 21, and the other tube end was also melt-sealed. The hydrochloric acid-containing tube 21 was inserted in a glass tube 22 and fixed there by means of fluororubber packing members 23. Then, 110 ml of pure water was fed to the glass tube 22 through a sampling opening 24, and the whole was placed in a constant-temperature vessel maintained at 25° C. On that occasion, the tube 21 between the packing members 23 was in contact with pure water, and the length of the contacting portion was 18.5 cm. The system was allowed to stand in that condition, and samples (each amounting to about 1 ml) were taken through the sampling opening 24 and the chloride ion concentration in each pure water sample was determined using an ion chromatograph, like in the case of sheet permeability testing.

[Percent Change in Specific Gravity]

A surface layer to a depth of 100 μm was stripped off from the outer layer surface of the laminated tube A specified in Table 2 using a microtome. The thus-prepared sample had a rectangular shape, 100 μm in maximum thickness, 3 mm long in the direction of extrusion and 1 mm long in the circumferential direction. Ten such rectangular specimens were prepared from each laminated tube species. The specific gravity of each specimen was measured using a density gradient tube, and the mean of 10 values was regarded as the specific gravity $X_1$ of the outer layer of the laminated tube A. Separately, the resin specified in Table 2 was compression-molded at a molding temperature higher by 50 to 70° C. than the melting point of each resin and a molding pressure of 5 MPa to give a sheet having a total thickness of 0.2±0.03 mm. Rectangular specimens, 100 μm in maximum thickness, 3 mm long in the direction of extrusion and 1 mm long in the circumferential direction, were cut off from the sheet obtained. Ten such rectangular specimens were prepared from each sheet species. In the same manner as the specific gravity $X_1$ of the above-mentioned laminated tube, the specific gravity of each of these specimens was measured using a density gradient tube, and the mean of 10 values was regarded as the specific gravity Y of the compression-molded sheet. The percent change in specific gravity was calculated as follows:

$$D = X_1/Y \times 100 (\%)$$

The thus-obtained D value is shown in Table 2.

EXAMPLE 2

The polymerization and after-treatment were carried out in the same manner as in Example 1 except that 19.3 kg of CTFE and 13 kg of TFE were used in the initial monomer charge, to give 20.6 kg of a CTFE copolymer (B) as a granular powder. Since the CTFE copolymer B obtained had a relatively low melting point, the tetrafluoroethylene/perfluoro(methyl vinyl ether) copolymer [MFA] described later in Comparative Example 4, which had a melting point lower than that of PFA, was used as the inner layer of the laminated tube. The copolymer was measured for adhesion strength with PTFE, without carrying out the adhesion strength measurement with PFA or with FEP. Otherwise, the same physical characteristics evaluations as in Example 1 were carried out. The results are shown in Table 2.

[Copolymer-to-PTFE Adhesion Strength Measurement]

The CTFE copolymer was compression-molded at a temperature higher by 50 to 70° C. than the melting point thereof and at a molding pressure of 5 MPa to give a sheet with a total thickness of 0.5±0.05 mm. The sheet and a PTFE sheet (trademark: New Polyflon PTFE M112, product of Daikin Industries) were compression-molded at a molding pressure of 0.2 MPa and a molding temperature of 340° C. Test specimens, 1 cm in width, were cut out of the compression molded sample having a laminated structure and subjected to a 180° peel test at a rate of 25 mm/minute using a Tensilon universal testing machine, and the initial adhesion strength (N/cm) was determined as the mean of five maximum points in elongation-tensile strength graphs.

EXAMPLE 3

The polymerization and after-treatment were carried out in the same manner as in Example 1 except that 5.8 kg of CTFE and 49.6 kg of TFE were used in the initial monomer charge, to give 24.6 kg of a CTFE copolymer (C) as a granular powder. The CTFE copolymer C obtained was evaluated for the same physical characteristics as in Example 1. The results are shown in Table 2.

EXAMPLE 4

The polymerization and after-treatment were carried out in the same manner as in Example 1 except that 2.4 kg of CTFE and 24.2 kg of TFE were used in the initial monomer charge, to give 23.8 kg of a CTFE copolymer (D) as a granular powder. No laminated tube B was manufactured from the CTFE copolymer D and, otherwise, the copolymer D was evaluated for the same physical characteristics as in Example 1. The results are shown in Table 2.

EXAMPLE 5

The polymerization and after-treatment were carried out in the same manner as in Example 1 except that 41.5 kg of CTFE and 4.6 kg of TFE were used in the initial monomer charge, to give 22.6 kg of a CTFE copolymer (E) as a granular powder. At this time, the rate of polymerization lowered to 71% as compared with Example 2. The CTFE copolymer E obtained was evaluated for the same physical characteristics as in Example 2 except for the MIT folding endurance and adhesion strength (with PTFE) measurements, which were omitted. The results are shown in Table 2.

EXAMPLE 6

The polymerization and after-treatment were carried out in the same manner as in Example 1 except that 9.2 kg of CTFE, 21.1 kg of TFE and 3.1 kg of PPVE were used as the initial charge monomers, to give 24.8 kg of a CTFE copolymer (F) as a granular powder. The CTFE copolymer F obtained was evaluated for the same physical characteristics as in Example 1 except for the adhesion strength measurements (with PFA, FEP and PTFE), which were omitted. The results are shown in Table 2.

EXAMPLE 7

The polymerization and after-treatment were carried out in the same manner as in Example 1 except that 7.1 kg of CTFE, 18.3 kg of TFE and 31.3 kg of PPVE were used as the initial charge monomers, to give 23.7 kg of a CTFE copolymer (G) as a granular powder. At this time, the rate of polymerization lowered to 65% as compared with Example 1. The CTFE copolymer G obtained was evaluated for the same physical characteristics as in Example 2 except for the adhesion strength measurement with PTFE, which was omitted. The results are shown in Table 2.

EXAMPLE 8

The polymerization and after-treatment were carried out in the same manner as in Example 1 except that PPVE was not used and that 29.3 kg of CTFE, 8.6 kg of TFE and 0.5 kg of ethylene were used as the initial charge monomers, to give 26.3 kg of a CTFE copolymer (H) as a granular powder. The CTFE copolymer H obtained was evaluated for the same physical characteristics as in Example 2 except for the MIT folding endurance and adhesion strength (with PTFE) measurements, which were omitted. The results are shown in Table 2.

EXAMPLE 9

The polymerization and after-treatment were carried out in the same manner as in Example 1 except that octafluorocyclobutane and PPVE were not used and that 3.9 kg of CTFE, 20.4 kg of TFE and 202 kg of hexafluoropropylene [HFP] were used as the initial charge monomers, to give 25.8 kg of a CTFE copolymer (I) as a granular powder. The CTFE copolymer I obtained was evaluated for the same physical characteristics as in Example 1 except for the MIT folding endurance and adhesion strength (with PFA, FEP and PTFE) measurements, which were omitted. The results are shown in Table 2.

EXAMPLE 10

The polymerization and after-treatment were carried out in the same manner as in Example 1 except that PPVE was not used and that 2.7 kg of CTFE and 22.8 kg of TFE were used as the initial charge monomers, to give 22.4 kg of a CTFE copolymer (J) as a granular powder. The CTFE copolymer J obtained was evaluated for the same physical characteristics as in Example 1 except for the MIT folding endurance and adhesion strength (with PFA, FEP and PTFE) measurements, which were omitted. The results are shown in Table 2.

EXAMPLE 11

The polymerization and after-treatment were carried out in the same manner as in Example 1 except that PPVE was not used and that 19.3 kg of CTFE, 13 kg of TFE and 7.4 kg of [H2P] ($CH_2=CFCF_2CF_2CF_2H$) were used as the initial charge monomers, to give 20.6 kg of a CTFE copolymer (K) as a granular powder.

The CTFE copolymer K obtained was evaluated for the same physical characteristics as in Example 2. The results are shown in Table 2.

COMPARATIVE EXAMPLE 1

The polymerization was carried out in the same manner as in Example 1 except that 6.6 kg of CTFE, 12.7 kg of TFE and 69.2 kg of PPVE were used as the initial charge monomers. Since, however, the rate of polymerization remarkably slowed down to 20% or less as compared with Example 2, the polymerization was discontinued after 8.2 hours. The CTFE copolymer obtained as a granular powder was subjected only to composition analysis, which confirmed that the copolymer had the desired copolymer composition. The analytical results are shown in Table 2.

COMPARATIVE EXAMPLE 2

The polymerization and after-treatment were carried out in the same manner as in Example 1 except that PPVE was not used and that 21.8 kg of CTFE, 14.3 kg of TFE and 2 kg of ethylene were used as the initial charge monomers, to give 23 kg of a CTFE copolymer (L) as a granular powder. However, the CTFE copolymer L obtained had an excessively lowered melting point, so that any laminated tube could not be manufactured. The results are shown in Table 2.

COMPARATIVE EXAMPLE 3

The polymerization was carried out in the same manner as in Example 1 except that octafluorocyclobutane and PPVE were not used and that 5.4 kg of CTFE, 5.8 kg of TFE and 205.1 kg of HFP were used as the initial charge monomers. Since, however, the rate of polymerization remarkably slowed down to 30% or less as compared with Example 8, the polymerization was discontinued after 8.0 hours. The CTFE copolymer obtained as a granular powder was subjected only to composition analysis, which confirmed that the copolymer had the desired copolymer composition. The analytical results are shown in Table 2.

COMPARATIVE EXAMPLE 4

A jacketed mixing vessel-type polymerizer with a capacity of 174 kg of water was charged with 51 kg of demineralized pure water, and the inside space was sufficiently purged with pure nitrogen gas and then the nitrogen gas was eliminated by evacuation. Then, 35 kg of octafluorocyclobutane and 10 kg of perfluoro(methyl vinyl ether) were fed under pressure to the polymerizer, the temperature was adjusted to 35° C. and stirring was started. Then TFE was fed under pressure until arrival at 0.78 MPa. Thereto was added 0.38 kg of a 50% (by mass) methanolic solution of NPP as a polymerization initiator to initiate the polymerization. During polymerization, the vessel inside pressure was maintained at 0.78 MPa while additionally feeding a monomer mixture prepared so that the composition thereof might be equal to the desired copolymer composition and, after carrying out the polymerization until arrival of the total additional charge amount at about 100% by mass relative to the solvent, the residual gases in the vessel were discharged, and the polymer formed was taken out, washed with demineralized pure water and dried to give 30 kg of a tetrafluoroethylene/perfluoro(methyl vinyl ether) copolymer [MFA] as a granular powder. The MFA obtained was evaluated for the same physical characteristics as in Example 1 except for the MIT folding endurance and adhesive strength (with PFA, FEP and PTFE) measurements, which were omitted. This MFA was not used as the outer layer material but in manufacturing a single layer tube or as the inner layer of the laminated tube comprising the CTFE copolymer having a relatively low melting point, namely B, E, G, H or K, or PCTFE. The results of the physical characteristics evaluations of the single layer tube as carried out in the same manner as in Example 1 are shown in Table 2.

COMPARATIVE EXAMPLE 5

A PCTFE in pellet form (trademark: Neoflon CTFE M300P, product of Daikin Industries) was evaluated for the same physical characteristics as in Example 1 except for the laminated tube B production and the adhesive strength measurements (with PFA, FEP and PTFE), which were omitted. The results are shown in Table 2.

COMPARATIVE EXAMPLE 6

A PCTFE in pellet form (trademark: Neoflon CTFE M300P, product of Daikin Industries) was evaluated for the same physical characteristics as in Example 2 except for the adhesive strength measurement with PTFE, which was omitted. The results are shown in Table 2.

COMPARATIVE EXAMPLE 7

A tetrafluoroethylene/perfluoro(propyl vinyl ether) copolymer in pellet form (trademark: Neoflon PFA AP231SH, product of Daikin Industries) was evaluated for the same physical characteristics as in Example 1 except for the adhesive strength measurements (with PFA, FEP and PTFE). This PFA was not used as the outer layer material but in manufacturing a single layer tube or as the inner layer of the laminated tube comprising the CTFE copolymer having a relatively high melting point, namely A, C, D, F, I or J, or PCTFE. The results of the physical characteristics evaluations of the single layer tube as carried out in the same manner as in Example 1 are shown in Table 2.

TABLE 2

| | | Sheet and single layer tube material or CTFE copolymer composition (mole percent) | | | | | | Physical characteristics of polymer | | | Sheet 35% (by mass) hydrochloric acid coefficient $[\times 10^{-13}$ (g·cm)/ | | Laminated tube A | |
|---|---|---|---|---|---|---|---|---|---|---|---|---|---|---|
| | | | | | | | | Thermal decomposition starting temperature [°C.] | Melting point [°C.] | MFR [g/10 min] | | | MIT folding endurance $[\times 10^4$ cycles] | 35% (by mass) hydrochloric acid permeability coefficient $[\times 10^{-13}$ (g·cm)/ (cm²·sec)] | $T_\beta$ [day] |
| | | CTFE | TFE | PPVE | Et | HFP | H2P | | | | (cm²·sec)] | $T_\beta$ [day] | | | |
| Example 1 | A | 34.5 | 64.0 | 1.5 | — | — | — | 420 | 245 | 1.6 | 0.25 | 3-30 | 198 | 0.85 | 3-50 |
| Example 2 | B | 61.6 | 37.0 | 1.4 | — | — | — | 392 | 199 | 11 | 0.07 | 3-30 | 2.1 | 0.29 | 3-50 |
| Example 3 | C | 24.7 | 73.0 | 2.3 | — | — | — | 430 | 246 | 1.0 | 0.68 | 3-30 | 245 | 1.07 | 3-50 |
| Example 4 | D | 12.4 | 86 | 1.6 | — | — | — | 442 | 282 | 3.5 | 0.98 | 3-30 | >250 | 2.89 | 3-50 |
| Example 5 | E | 87 | 11.5 | 1.5 | — | — | — | 382 | 195 | 9 | 0.05 | 3-30 | — | 0.22 | 3-50 |
| Example 6 | F | 35.1 | 64.5 | 0.4 | — | — | — | 410 | 255 | 1.3 | 0.29 | 3-30 | 45 | 1.03 | 3-50 |
| Example 7 | G | 31.7 | 63.6 | 4.7 | — | — | — | 383 | 206 | 4.3 | 0.42 | 3-30 | >250 | 1.95 | 3-50 |
| Example 8 | H | 68.7 | 22 | — | 9.3 | — | — | 370 | 172 | 8.0 | 0.09 | 3-30 | — | 1.03 | 3-50 |
| Example 9 | I | 17.5 | 73 | — | — | 9.5 | — | 395 | 225 | 14 | 0.80 | 3-30 | — | 2.58 | 3-50 |
| Example 10 | J | 29.7 | 70.3 | — | — | — | — | 416 | 258 | 0.8 | 0.51 | 3-30 | — | 2.18 | 3-50 |
| Example 11 | K | 61.1 | 37.4 | — | — | — | 1.5 | 392 | 202 | 12.0 | 0.06 | 3-30 | >250 | 0.29 | 3-50 |
| Comp. Example 1 | | 34.5 | 52.5 | 13 | — | — | — | — | — | — | — | — | — | — | — |

TABLE 2-continued

| | | | | | | | | | | | | | |
|---|---|---|---|---|---|---|---|---|---|---|---|---|---|
| Comp. Example 2 | L | 52.9 | 17.1 | — | 30 | — | — | 348 | 140 | 18 | 0.97 | 3-30 | — | — | — |
| Comp. Example 3 | | 38 | 44 | — | — | 18 | — | — | — | — | — | — | — | — | — |
| Comp. Example 4 | | | | MFA | | | | 433 | 224 | 6.8 | 5.85 | 2-6 | — | 5.92 (Single layer) | 3-20 |
| Camp. Example 5 | | | | PCTFE | | | | 362 | 213 | — | 0.03 | 3-30 | 0.02 | 6.27 | 3-20 |
| Comp. Example 6 | | | | PCTFE | | | | 362 | 213 | — | 0.03 | 3-30 | 0.02 | 0.35 | 3-50 |
| Comp. Example 7 | | | | PFA | | | | 473 | 304 | 2.1 | 6.20 | 2-6 | >250 | 6.21 (Single layer) | 3-20 |

| | | | | | Laminated tube B | | Laminated tube A manufacturing conditions | | | | | | |
|---|---|---|---|---|---|---|---|---|---|---|---|---|---|
| | | | | | 35% (by mass) hydrochloric acid | | | | | | | | |
| | | Adhesion strength with PFA [N/cm] | Adhesion strength with FEP [N/cm] | Adhesion strength with PTFE [N/cm] | Percent change in specific gravity [%] | permeability coefficient [×10⁻¹³ (g·cm)/ (cm²·sec)] | $T_\beta$ [day] | Inner layer material | Cylinder temperature | | Die temperature [° C.] | Tube take-off speed [m/min] | Each layer thickness | |
| | | | | | | | | | Outer layer [° C.] | Inner layer [° C.] | | | Outer layer [mm] | Inner layer [mm] |
| Example 1 | A | 21 | 24 | — | 0 | 0.89 | 3-50 | PFA | 330 | 380 | 395 | 0.5 | 0.20 | 1.40 |
| Example 2 | B | — | — | 38 | 0 | 0.48 | 3-50 | MFA | 280 | 270 | 290 | 0.5 | 0.20 | 1.39 |
| Example 3 | C | 30 | 43 | — | 0 | 0.98 | 3-50 | PFA | 330 | 380 | 395 | 0.5 | 0.20 | 1.40 |
| Example 4 | D | 38 | 48 | — | 1 | — | — | PFA | 380 | 380 | 395 | 0.5 | 0.21 | 1.39 |
| Example 5 | E | — | — | — | −2 | 0.53 | 3-50 | MFA | 280 | 270 | 290 | 0.5 | 0.20 | 1.40 |
| Example 6 | F | — | — | — | 0 | 2.79 | 3-50 | PFA | 360 | 380 | 395 | 0.5 | 0.20 | 1.38 |
| Example 7 | G | — | — | — | −4 | 1.83 | 3-50 | MFA | 290 | 270 | 290 | 0.5 | 0.20 | 1.39 |
| Example 8 | H | — | — | — | −6 | 2.26 | 3-50 | MFA | 260 | 270 | 290 | 0.5 | 0.20 | 1.38 |
| Example 9 | I | — | — | — | −3 | 2.79 | 3-50 | PFA | 320 | 380 | 395 | 0.5 | 0.20 | 1.38 |
| Example 10 | J | — | — | — | 0 | 5.9 | 3-20 | PFA | 340 | 380 | 395 | 0.5 | 0.23 | 1.38 |
| Example 11 | K | — | — | 35 | 0 | 0.38 | 3-50 | MFA | 280 | 270 | 290 | 0.5 | 0.2 | 1.39 |
| Comp. Example 1 | | — | — | — | — | — | — | — | — | — | — | — | — | — |
| Comp. Example 2 | L | — | — | — | — | — | — | — | — | — | — | — | — | — |
| Comp. Example 3 | | — | — | — | — | — | — | — | — | — | — | — | — | — |
| Comp. Example 4 | | — | — | — | 0 | 6.14 (Single layer) | 3-20 | MFA | — | 270 | 290 | 0.5 | 0.21 | 1.39 |
| Camp. Example 5 | | — | — | — | −74 | — | — | PFA | 290 | 391 | 395 | 0.5 | 0.2 | 1.37 |
| Comp. Example 6 | | — | — | — | −5 | 5.28 | 3-20 | MFA | 290 | 270 | 290 | 0.5 | 0.21 | 1.39 |
| Comp. Example 7 | | — | — | — | 0 | 6.11 (Single layer) | 3-20 | PFA | — | 380 | 395 | 0.5 | — | 1.59 |

Among the physical characteristics evaluation results shown in Table 2, the hydrochloric acid permeability coefficients of the film sheets as shown are those hydrochloric acid permeability coefficients for the film sheets molded under relatively mild molding temperature conditions, namely at a temperature higher by 50 to 70° C. than the melting point of each CTFE copolymer, PFA, MFA or PCTFE, and the permeability coefficients of the CTFE copolymer or PCTFE film sheets are about ⅙ to 1/100 of the coefficient of the PFA or MFA single layer sheet, indicating that they are evidently superior from the low chemical liquid permeability viewpoint. It was found that a copolymer composition higher in CTFE content tends to show a lower permeability coefficient, though depending on the comonomer species. Now, the laminated tube A evaluation results are discussed. It was found that by lamination of an about 1.4-mm-thick PFA layer or MFA layer with only an about 0.2-mm-thick layer of one of the CTFE copolymers A to K, it is possible to provided the PFA or MFA layer with excellent low liquid chemical permeability, namely ½ to 1/50 permeability as compared with the PFA single layer tube. However, it was found that while the PCTFE used in Comparative Example 5, in the film sheet form, was very excellent from the low liquid chemical permeability viewpoint, the low liquid chemical permeability providing effect of the PCTFE could not be produced at all in the laminated tube A obtained by lamination with PFA. Upon visual observation, foaming was detected in the outer layer. From the changes in specific gravity, this was estimated to be due to thermal decomposition the PCTFE, which has a decomposition starting temperature of 362° C., and to foaming in the layer thereof as a result of exposure thereof to such a high temperature as the die temperature of 395° C. required for molding of the PFA in the coextrusion processes in the Examples and Comparative Examples. Therefore, in Comparative Example 6, the PCTFE was coextruded with the MFA, which has a lower maximum molding temperature; it was found that the laminated tube A showed a satisfactory low level of liquid chemical permeability comparable to that of the CTFE copolymer mentioned above.

Further, the laminated tubes B obtained by dynamic stress application to the laminated tubes A were tested for outer layer stress cracking. Liquid chemical feeding tubes, for instance, are exposed to various stresses in the practical use thereof, so that it is important for the laminated tubes to have an outer layer sufficiently resistant to stress cracking. The stress is, for example, the internal pressure exerted by the liquid chemical during transfer. If a laminated tube B retains the permeability coefficient of the corresponding laminated tube A, the outer layer can be judged to have good stress cracking resistance. In the above-mentioned Comparative Example 6, the PCTFE, when evaluated as laminated tube A, was found to have a satisfactorily low liquid chemical permeability. However, in the form of laminated tube B, it showed a sharp increase in permeability coefficient and, thus, the low liquid chemical permeability of the PCTFE itself could not be displayed as compared with the MFA single layer. This was due to cracking of the PCTFE outer layer as caused by repeated dynamic stress application. Upon visual observation, the surface layer showed signs of whitening.

On the contrary, the laminated tubes B comprising the CTFE copolymers described in the Examples all maintained the permeability coefficient levels of the corresponding laminated tubes A; thus, the low liquid chemical permeability of each CTFE copolymer was satisfactorily manifested. It was thus revealed that the use of the CTFE copolymers as the outer layer materials can result in distinct improvements in stress cracking resistance as compared with the use of the PCTFE.

For attaining an improvement in stress cracking resistance, it is important that an appropriate amount of PPVE, for instance, be copolymerized. Without using PPVE, for instance, there arises the possibility that the liquid chemical barrier properties may not be maintained in the fields of use where stress cracking resistance is required, as indicated in Example 10. Even in this case, however, as compared with the PCTFE of Comparative Example 5, the CTFE/TFE copolymer itself showed improved thermal stability, so that relatively good permeability coefficients were shown even after exposure to high temperature molding conditions. It was revealed that when the amount of PPVE is excess, as in Comparative Example 1, the rate of polymerization markedly decreases, whereby the productivity is reduced.

It was revealed that the adhesion between the CTFE copolymer of the invention and PFA or FEP tends to become improved with the decrease in CTFE unit mole percent in the CTFE copolymer of the invention. It was found that, when the CTFE unit mole percent was not higher than 35 mole percent, in particular, good adhesion was obtained and, when it was not higher than 30 mole percent, still better adhesion was attained. These results indicate that when firm interlayer adhesion is required according to the intended use, it is possible to attain both satisfactory permeability coefficient and good adhesiveness simultaneously when the CTFE unit mole percent is adequately selected within the above range.

The fluid transfer member of the invention, which has the constitution described hereinabove, has both good stress cracking resistance and low liquid chemical permeability simultaneously and, further, has chemical resistance and that thermal stability which is required in the step of molding.

INDUSTRIAL APPLICABILITY

The fluid transfer member of the invention can be suitably used, for example, as a low liquid chemical permeability tube required to have stress cracking resistance and low liquid chemical permeability simultaneously.

EXPLANATION OF SYMBOLS

11—Sample sheet
12*a*—Glass container (containing 35% (by mass) hydrochloric acid)
12*b*—Glass container (containing pure water)
13—O ring
14—Sampling opening
21—Tube
22—Glass tube
23—Packing
24—Sampling opening

The invention claimed is:

1. A fluid transfer member which is composed by a laminate containing
a layer [P] comprising a fluoropolymer and/or a fluorine-free organic material and
a layer [Q] comprising a chlorotrifluoroethylene copolymer,
wherein the chlorotrifluoroethylene copolymer is a chlorotrifluoroethylene copolymer consisting of chlorotrifluoroethylene unit, tetrafluoroethylene unit and a monomer [B] unit derived from a monomer [B] copolymerizable with chlorotrifluoroethylene and tetrafluoroethylene,
wherein the sum of said chlorotrifluoroethylene unit and said tetrafluoroethylene unit amounts to 90 to 99.9 mole percent and
said monomer [B] unit amounts to 10 to 0.1 mole percent,
wherein said chlorotrifluoroethylene unit amounts to 12.4 to 61.6 mole percent of units constituting the chlorotrifluoroethylene copolymer,
wherein said monomer [B] is at least one monomer selected from the group consisting of a perfluoro(alkyl vinyl ether) and a vinyl monomer represented by the general formula (I):

$$CX^3X^4\!=\!CX^1(CF_2)_n\!-\!X^2 \qquad (I)$$

wherein $X^1$, $X^3$ and $X^4$ are the same or different and each represents hydrogen atom or fluorine atom, $X^2$ represents hydrogen atom, fluorine atom or chlorine atom and n represents an integer of 1 to 10,
the temperature required for 1% by mass of the chlorotrifluoroethylene copolymer to be decomposed is not lower than 380° C.

2. The fluid transfer member according to claim 1,
wherein the fluoropolymer is at least one species selected from the group consisting of a tetrafluoroethylene/perfluoro(alkyl vinyl ether) copolymer, a tetrafluoroethylene/hexafluoropropylene copolymer, an ethylene/tetrafluoroethylene copolymer, a polychlorotrifluoroethylene, an ethylene/chlorotrifluoroethylene copolymer and a polyvinylidene fluoride.

3. The fluid transfer member according to claim 1, wherein the layer [P] is the innermost layer.

4. The fluid transfer member according to claim 1, wherein the fluoropolymer contains not more than 80 unstable terminal groups per $10^6$ carbon atoms.

5. The fluid transfer member according to claim 1, wherein the chlorotrifluoroethylene copolymer contains not more than 80 unstable terminal groups per $10^6$ carbon atoms.

6. The fluid transfer member according to claim 1, wherein the fluoropolymer is a tetrafluoroethylene/perfluoro(alkyl vinyl ether) copolymer.

7. The fluid transfer member according to claim 1, which is a tube for semiconductor manufacturing equipment.

8. The fluid transfer member according to claim 1, which is a sheet or a film for semiconductor manufacturing equipment.

9. The fluid transfer member according to claim 1, wherein the monomer [B] is a perfluoro(alkyl vinyl ether).

* * * * *